(12) United States Patent
Takahashi et al.

(10) Patent No.: US 10,476,702 B2
(45) Date of Patent: Nov. 12, 2019

(54) USER EQUIPMENT, BASE STATION, INFORMATION REPORTING METHOD, AND INFORMATION RECEIVING METHOD

(71) Applicant: NTT DOCOMO, INC., Tokyo (JP)

(72) Inventors: Hideaki Takahashi, Tokyo (JP); Hiromasa Umeda, Tokyo (JP); Wuri Andarmawanti Hapsari, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/541,729

(22) PCT Filed: Aug. 3, 2016

(86) PCT No.: PCT/JP2016/072730
§ 371 (c)(1),
(2) Date: Jul. 6, 2017

(87) PCT Pub. No.: WO2017/026334
PCT Pub. Date: Feb. 16, 2017

(65) Prior Publication Data
US 2018/0019898 A1  Jan. 18, 2018

(30) Foreign Application Priority Data
Aug. 13, 2015  (JP) .................................. 2015-159995

(51) Int. Cl.
*H04L 25/02* (2006.01)
*H04W 28/06* (2009.01)
(Continued)

(52) U.S. Cl.
CPC ........ *H04L 25/0208* (2013.01); *H04L 5/0035* (2013.01); *H04L 5/0098* (2013.01);
(Continued)

(58) Field of Classification Search
CPC ......... H04L 25/02; H04L 5/00; H04L 5/0035; H04L 5/0098; H04L 25/0208;
(Continued)

(56) References Cited

U.S. PATENT DOCUMENTS

| 2011/0319069 A1* | 12/2011 | Li | ............................ | H04W 8/22 455/422.1 |
| 2013/0235840 A1* | 9/2013 | Xiao | ....................... | H04L 5/001 370/329 |

FOREIGN PATENT DOCUMENTS

| EP | 2400790 A1 | 12/2011 |
| EP | 2624649 A1 | 8/2013 |

OTHER PUBLICATIONS

Huawei et al. "UE CA capability signaling for BSC"; 3GPP TSG-RAN WG2 Meeting#90, R2-152245; Fukuoka, Japan; Vlay 25-29, 2015 (3 Pages) (Year: 2015).*
(Continued)

*Primary Examiner* — Kyaw Z Soe
(74) *Attorney, Agent, or Firm* — Osha Liang LLP

(57) ABSTRACT

There is provided user equipment for communicating with a base station in a radio communication system supporting carrier aggregation, the user equipment including a generator that generates band combination information indicating one or more band combinations capable of being used for the carrier aggregation in the user equipment; and a transmitter that transmits the generated band combination information to the base station, wherein the generator generates the band combination information including highest band combination information indicating a highest band combination having a largest number of CCs to be combined, among the one or more band combinations capable of being used for the carrier aggregation in the user equipment.

7 Claims, 27 Drawing Sheets

(51) Int. Cl.
*H04L 5/00* (2006.01)
*H04W 72/08* (2009.01)
*H04W 72/04* (2009.01)
*H04W 8/24* (2009.01)
*H04L 27/26* (2006.01)

(52) U.S. Cl.
CPC ......... *H04W 28/06* (2013.01); *H04W 72/048* (2013.01); *H04W 72/085* (2013.01); *H04L 5/001* (2013.01); *H04L 27/2657* (2013.01); *H04W 8/24* (2013.01); *H04W 72/0453* (2013.01)

(58) Field of Classification Search
CPC .... H04L 5/001; H04L 27/2657; H04W 72/08; H04W 28/06; H04W 72/048; H04W 72/085; H04W 8/24; H04W 72/0453
See application file for complete search history.

(56) References Cited

OTHER PUBLICATIONS

Office Action issued in counterpart Japanese Patent Application No. 2017-534379, dated Jun. 12, 2018 (7 Pages).
Extended European Search Report issued in corresponding European Application No. 16835031.2, dated Jul. 2, 2018 (12 pages).
Huawei et al.; "UE CA capability signalling for B5C"; 3GPP TSG-RAN WG2 Meeting #90, R2-152245; Fukuoka, Japan; May 25-29, 2015 (3 pages).
Office Action issued in corresponding Japanese Patent Application No. 2017-534379, dated Oct. 31, 2017 (7 pages).
NTT DOCOMO, Inc., "Solution to reduce CA capability signalling size for B5C", 3GPP TSG-RAN WG2 #91, R2-153102, Beijing, P.R. China, Aug. 24-28, 2015 (8 pages).
Office Action issued in corresponding Japanese Application No. 2017-534379, dated Jan. 30, 2018 (7 pages).
International Search Report issued in corresponding application No. PCT/JP2016/072730 dated Oct. 18, 2016 (4 pages).
Written Opinion of the International Searching Authority issued in corresponding application No. PCT/JP2016/072730 dated Oct. 18, 2016 (4 pages).
NTT DOCOMO, Inc., "Overhead reduction for CA band combination signalling"; 3GPP TSG-RAN WG2 #85bis, R2-141131; Valencia, Spain; Mar. 31-Apr. 4, 2014 (5 pages).
Ericsson, "Network-requested CA Band Combination Capability Signalling"; 3GPP TSG-RAN WG2 Meeting #86, R2-142488; Seoul, South Korea; Mar. 19-May 23, 2014 (22 pages).
3GPP TS 36.331 V12.6.0, "3rd Generation Partnership Project; Technical Specification Group Radio Access Network; Evolved Universal Terrestrial Radio Access (E-UTRA); Radio Resource Control (RRC); Protocol Specification (Release 12)"; Jun. 2015 (449 pages).
3GPP TS 36.306 V125.0, "3rd Generation Partnership Project; Technical Specification Group Radio Access Network; Evolved Universal Terrestrial Radio Access (E-UTRA); User Equipment (UE) radio access capabilities (Release 12)"; Jun. 2015 (44 pages).
3GPP TS 36.101 V13.0.0, 3rd Generation Partnership Project; Technical Specification Group Radio Access Network; Evolved Universal Terrestrial Radio Access (E-UTRA); User Equipment (UE) radio transmission and reception (Release 13); Jul. 2015 (699 pages).
Notice of Reasons for Rejection issued in counterpart Japanese Patent Application No. 2017-534379, dated Feb. 19, 2019 (6 Pages).
Office Action issued in corresponding European Application No. 16835031.2, dated Mar. 25, 2019 (9 pages).
Office Action issued in corresponding Japanese Application No. 2018-086434, dated May 28, 2019 (7 pages).

* cited by examiner

FIG.3A

PARAMETERS FOR EACH CA BAND COMBINATION

| supprtedBandWidthCombinationSet |
|---|
| multipleTimingAdvance |
| simultaneousRx-Tx |
| dc-Support |
| supportedNAICS-2CRS-AP |
| commSupportedBandsPerBC |

FIG.3B

PARAMETERS FOR EACH CA BAND COMBINATION

| bandEUTRA |
|---|
| interFreqNeedForGaps |
| supportedCSI-Proc |
| Ca-BandWidthClass (UL/DL) |
| supportedMIMO-Capability (UL/DL) |

FIG.4

Table 5.6A-1: CA bandwidth classes and corresponding nominal guard bands (TS36.101)

| CA Bandwidth Class | Aggregated Transmission Bandwidth Configuration | Number of contiguous CC | Nominal Guard Band $BW_{GB}$ |
|---|---|---|---|
| A | $N_{RB,agg} \leq 100$ | 1 | $a_1 BW_{Channel(1)} - 0.5 \Delta f_1$ (NOTE 2) |
| B | $25 < N_{RB,agg} \leq 100$ | 2 | $0.05\ max\ \{BW_{Channel(1)}, BW_{Channel(2)}\} - 0.5 \Delta f_1$ |
| C | $100 < N_{RB,agg} \leq 200$ | 2 | $0.05\ max\ \{BW_{Channel(1)}, BW_{Channel(2)}\} - 0.5 \Delta f_1$ |
| D | $200 < N_{RB,agg} \leq 300$ | 3 | $0.05\ max\ \{BW_{Channel(1)}, BW_{Channel(2)}, BW_{Channel(3)}\} - 0.5 \Delta f_1$ |
| E | $300 < N_{RB,agg} \leq 400$ | 4 | NOTE 3 |
| F | $400 < N_{RB,agg} \leq 500$ | 5 | NOTE 3 |

NOTE 1: $BW_{Channel(j)}$, j = 1, 2, 3, is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.

NOTE 2: $a_1 = 0.16/1.4$ for $BW_{Channel(1)} = 1.4$ MHz whereas $a_1 = 0.05$ for all other channel bandwidths.

NOTE 3: Applicable for later releases.

CA Bandwidth Class combinations

| CA band comb. | No. | direction | frequency band 800M (19A) | 1.5G (21A) | 2G (1A) |
|---|---|---|---|---|---|
| 3DL/3UL | 1 | UL | A | A | A |
| | | DL | A | A | A |
| 3DL/2UL | 2 | UL | A | A | |
| | | DL | A | A | A |
| | 3 | UL | | A | A |
| | | DL | A | A | A |
| | 4 | UL | A | | A |
| | | DL | A | A | A |
| 3DL/1UL | 5 | UL | A | | |
| | | DL | A | A | A |
| | 6 | UL | | A | |
| | | DL | A | A | A |
| | 7 | UL | | | A |
| | | DL | A | A | A |
| 2DL/2UL | 8 | UL | A | A | |
| | | DL | A | A | |
| | 9 | UL | | A | A |
| | | DL | | A | A |
| | 10 | UL | A | | A |
| | | DL | A | | A |
| 2DL/1UL | 11 | UL | A | | |
| | | DL | A | A | |
| | 12 | UL | | A | |
| | | DL | A | A | |
| | 13 | UL | | A | |
| | | DL | | A | A |
| | 14 | UL | | | A |
| | | DL | | A | A |
| | 15 | UL | A | | |
| | | DL | A | | A |
| | 16 | UL | | | A |
| | | DL | A | | A |
| Non-CA | 17 | UL | A | | |
| | | DL | A | | |
| | 18 | UL | | A | |
| | | DL | | A | |
| | 19 | UL | | | A |
| | | DL | | | A |

FALLBACK BAND COMBINATION

MIMO capability (NUMBER OF SUPPORTED LAYERS)

| CA band comb. | No. | direction | frequency band | | |
|---|---|---|---|---|---|
| | | | 800M (19A) | 1.5G (21A) | 2G (1A) |
| 3DL/3UL | 1 | UL | 2 | 2 | 2 |
| | | DL | 2 | 2 | 2 |
| 2DL/2UL | 2 | UL | 2 | 2 | |
| | | DL | 2 | 2 | |
| | 3 | UL | | 2 | 2 |
| | | DL | | 2 | 2 |
| | 4 | UL | 2 | | 2 |
| | | DL | 2 | | 2 |
| ... | | | | | |

FIG.9

CA Bandwidth Class combinations

| CA band comb. | No. | direction | frequency band | | | |
|---|---|---|---|---|---|---|
| | | | 800M (19A) | 1.5G (21A) | 2G (1A) | |
| 3DL/3UL | 1 | UL | A | A | A | X |
| | | DL | A | A | A | |
| 3DL/2UL | 2 | UL | A | A | | |
| | | DL | A | A | A | |
| | 3 | UL | | A | A | |
| | | DL | A | A | A | |
| | 4 | UL | A | | A | |
| | | DL | A | A | A | |
| 3DL/1UL | 5 | UL | A | | | |
| | | DL | A | A | A | Y |
| | 6 | UL | | A | | |
| | | DL | A | A | A | |
| | 7 | UL | | | A | |
| | | DL | A | A | A | |
| 2DL/2UL | 8 | UL | A | A | | |
| | | DL | A | A | | |
| | 9 | UL | | A | A | |
| | | DL | | A | A | |
| | 10 | UL | A | | A | Z |
| | | DL | A | | A | |
| 2DL/1UL | 11 | UL | A | | | |
| | | DL | A | A | | |
| | 12 | UL | | A | | |
| | | DL | A | A | | |
| | 13 | UL | | A | | |
| | | DL | | A | A | |
| | 14 | UL | | | A | |
| | | DL | | A | A | |
| | 15 | UL | A | | | |
| | | DL | A | | A | |
| | 16 | UL | | | A | |
| | | DL | A | | A | |
| Non-CA | 17 | UL | A | | | |
| | | DL | A | | | |
| | 18 | UL | | A | | |
| | | DL | | A | | |
| | 19 | UL | | | A | |
| | | DL | | | A | |

FIG.10

MIMO capability (NUMBER OF SUPPORTED LAYERS)

| CA band comb. | No. | direction | frequency band | | |
|---|---|---|---|---|---|
| | | | 800M (19A) | 1.5G (21A) | 2G (1A) |
| 3DL/3UL | 1 | UL | 2 | 2 | 2 |
| | | DL | 2 | 2 | 2 |
| 2DL/2UL | 2 | UL | 2 | 4 | |
| | | DL | 2 | 4 | |
| | 3 | UL | | 2 | 2 |
| | | DL | | 2 | 2 |
| | 4 | UL | 2 | | 4 |
| | | DL | 2 | | 4 |
| ... | | | | | |

FIG.15

```
                         UECapabilityEnquiry message

-- ASN1START

UECapabilityEnquiry ::=          SEQUENCE {
    rrc-TransactionIdentifier        RRC-TransactionIdentifier,
    criticalExtensions               CHOICE {
        c1                               CHOICE {
            ueCapabilityEnquiry-r8           UECapabilityEnquiry-r8-IEs,
            spare3 NULL, spare2 NULL, spare1 NULL
        },
        criticalExtensionsFuture         SEQUENCE {}
    }
}

UECapabilityEnquiry-r8-IEs ::=   SEQUENCE {
    ue-CapabilityRequest             UE-CapabilityRequest,
    nonCriticalExtension             UECapabilityEnquiry-v8a0-IEs         OPTIONAL
}

UECapabilityEnquiry-v8a0-IEs ::= SEQUENCE {
    lateNonCriticalExtension         OCTET STRING                         OPTIONAL,
    nonCriticalExtension             UECapabilityEnquiry-v1180-IEs
    OPTIONAL
}

UECapabilityEnquiry-v1180-IEs ::= SEQUENCE {
    requestedFrequencyBands-r11      SEQUENCE (SIZE (1..16)) OF FreqBandIndicator-r11
            OPTIONAL,
    nonCriticalExtension             SEQUENCE {}                          OPTIONAL
}

UECapabilityEnquiry-v13xy-IEs ::= SEQUENCE {
    enhancedCAcapabilityRequest-r13  BOOLEAN                              OPTIONAL,
    nonCriticalExtension             SEQUENCE {}                          OPTIONAL
}

UE-CapabilityRequest ::=         SEQUENCE (SIZE (1..maxRAT-Capabilities)) OF RAT-Type

-- ASN1STOP
```

| *UECapabilityEnquiry* field descriptions |
|---|
| ue-CapabilityRequest<br>List of the RATs for which the UE is requested to transfer the UE radio access capabilities i.e. E-UTRA, UTRA, GERAN-CS, GERAN-PS, CDMA2000. |
| requestedFrequencyBands<br>List of frequency bands for which the UE is requested to provide supported CA band combinations and non CA bands. |
| enhancedCAcapabilityRequest<br>Indicates that the UE if supported is requested to provide the *supportedBandCombination-r13* instead of the *supportedBandCombination-r10*. |

FIG.17

```
                    UE-EUTRA-Capability information element
-- ASN1START

UE-EUTRA-Capability ::=          SEQUENCE {
<< skip unchanged part >>
    nonCriticalExtension         UE-EUTRA-Capability-v920-IEs        OPTIONAL
}
<< skip unchanged part >>
UE-EUTRA-Capability-v1260-IEs ::=   SEQUENCE {
<< skip unchanged part >>
    nonCriticalExtension         UE-EUTRA-Capability-v13xy-IEs
    OPTIONAL
}

UE-EUTRA-Capability-v13xy-IEs ::=   SEQUENCE {
    rf-Parameters-v13xy          RF-Parameters-v13xy                 OPTIONAL,
    nonCriticalExtension         SEQUENCE {}                         OPTIONAL
}

RF-Parameters-v13xy ::=          SEQUENCE {
    supportedBandCombination-r13    SupportedBandCombination-r13     OPTIONAL,
}

SupportedBandCombination-r13 ::= SEQUENCE (SIZE (1..maxBandComb-r13)) OF
BandCombinationParametersParent-r13

BandCombinationParametersParent-r13 ::= SEQUENCE {
    bandParameterList-r13        SEQUENCE (SIZE (1..maxSimultaneousBands-r10)) OF
            BandParameters-r11,
    supportedBandwidthCombinationSet-r13   SupportedBandwidthCombinationSet-r10   OPTIONAL,
    multipleTimingAdvance-r13    ENUMERATED {supported}              OPTIONAL,
    simultaneousRx-Tx-r13        ENUMERATED {supported}              OPTIONAL,
    bandInfoEUTRA-r13            BandInfoEUTRA,
    dc-Support-r12               SEQUENCE {
        asynchronous-r12             ENUMERATED {supported}          OPTIONAL,
        supportedCellGrouping-r12    CHOICE {
            threeEntries-r12             BIT STRING (SIZE(3)),
            fourEntries-r12              BIT STRING (SIZE(7)),
            fiveEntries-r12              BIT STRING (SIZE(15))
        }                                                            OPTIONAL
    }                                                                OPTIONAL,
    supportedNAICS-2CRS-AP-r12   BIT STRING (SIZE (1..maxNAICS-Entries-r12))   OPTIONAL,
    commSupportedBandsPerBC-r12        BIT STRING (SIZE (1.. maxBands))         OPTIONAL,
    non-SupportedBandCombinationChild-r13   SEQUENCE (SIZE (1..maxBandComb-r13)) OF
BandCombinationParameters-r13,
    supportedBandCombinationChildExt-r13   SEQUENCE (SIZE (1..maxBandComb-r13)) OF
BandCombinationParametersChildExt-r13
}

BandCombinationParametersChildExt-r13 ::=   SEQUENCE {
    bandParameterList-r13        SEQUENCE (SIZE (1..maxSimultaneousBands-r10)) OF
            BandParameters-r11,
    supportedBandwidthCombinationSet-r13   SupportedBandwidthCombinationSet-r10   OPTIONAL,
    multipleTimingAdvance-r13    ENUMERATED {supported}              OPTIONAL,
    simultaneousRx-Tx-r13        ENUMERATED {supported}              OPTIONAL,
    bandInfoEUTRA-r13            BandInfoEUTRA,
    dc-Support-r12               SEQUENCE {
        asynchronous-r12             ENUMERATED {supported}          OPTIONAL,
        supportedCellGrouping-r12    CHOICE {
            threeEntries-r12             BIT STRING (SIZE(3)),
            fourEntries-r12              BIT STRING (SIZE(7)),
            fiveEntries-r12              BIT STRING (SIZE(15))
        }                                                            OPTIONAL
    }                                                                OPTIONAL,
    supportedNAICS-2CRS-AP-r12   BIT STRING (SIZE (1..maxNAICS-Entries-r12))   OPTIONAL,
    commSupportedBandsPerBC-r12        BIT STRING (SIZE (1.. maxBands))         OPTIONAL
}

BandParameters-r11 ::= SEQUENCE {
    bandEUTRA-r11                FreqBandIndicator-r11,
    bandParametersUL-r11         BandParametersUL-r10                OPTIONAL,
    bandParametersDL-r11         BandParametersDL-r10                OPTIONAL,
    supportedCSI-Proc-r11        ENUMERATED {n1, n3, n4}             OPTIONAL
}

BandParameters-r13 ::= SEQUENCE {
```

FIG.18

```
    bandEUTRA-r13              FreqBandIndicator-r11,
    bandParametersUL-r13       BandParametersUL-r10                  OPTIONAL,
    bandParametersDL-r13       BandParametersDL-r10                  OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10        CA-BandwidthClass-r10,
    supportedMIMO-CapabilityUL-r10 MIMO-CapabilityUL-r10             OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10        CA-BandwidthClass-r10,
    supportedMIMO-CapabilityDL-r10 MIMO-CapabilityDL-r10             OPTIONAL
}

CA-BandwidthClass-r10 ::= ENUMERATED {a, b, c, d, e, f, ...}

MIMO-CapabilityUL-r10 ::= ENUMERATED {twoLayers, fourLayers}

MIMO-CapabilityDL-r10 ::= ENUMERATED {twoLayers, fourLayers, eightLayers}

BandInfoEUTRA ::=              SEQUENCE {
    interFreqBandList              InterFreqBandList,
    interRAT-BandList              InterRAT-BandList        OPTIONAL
}

InterFreqBandList ::=          SEQUENCE (SIZE (1..maxBands)) OF InterFreqBandInfo InterFreqBandInfo ::=          SEQUENCE {
    interFreqNeedForGaps           BOOLEAN
}

InterRAT-BandList ::=          SEQUENCE (SIZE (1..maxBands)) OF InterRAT-BandInfo InterRAT-BandInfo ::=          SEQUENCE {
    interRAT-NeedForGaps           BOOLEAN
}
<< skip unchanged part >>
-- ASN1STOP
```

| UE-EUTRA-Capability field descriptions | FDD/ TDD diff |
|---|---|
| *supportedBandCombination-r13* <br> Includes the supported parent band combinations for the UE. The parent band combination is defined as a band combination whose supported number of CCs is the maximum number for both UL and DL among all the band combinations supported by the UE. The UE shall not include fallback combinations from the parent band combination, whose supported number of CCs is less than the parent band combination in UL and DL. By default, the eNB considers all the fallback combinations including Non-CA band combinations for a parent band combination supported unless it is indicated in the *non-supportedBandCombinationChild.* | = |
| *BandCombinationParametersParent* <br> Indicates the band combination parameters for a parent band combination defined as a band combination whose supported number of CCs is the maximum number for both UL and DL among the band combinations supported by the UE. | = |
| *non-SupportedBandCombinationChild* <br> Includes the fallback band combinations of a parent band combination which are not supported by the UE. | = |
| *supportedBandCombinationChildExt* <br> Includes the fallback band combinations of a parent band combination supported by the UE whose band combination parameters are different from the parent band combination. If some fields are absent for a fallback band combination, these values are the same as the parent band combination. | = |

FIG.19

5.6.3.3 Reception of the *UECapabilityEnquiry* by the UE

The UE shall:

3> if the UECapabilityEnquiry message includes enhancedCAcapabilityRequest and the UE supports to form and include the suppotedBandCombination-r13 in UE-EUTRA-Capability:

4> if the *UECapabilityEnquiry* message includes *requestedFrequencyBands* and UE supports *requestedFrequencyBands*:

5> create a set of band combinations supported by the UE, only consisting of bands included in *requestedFrequencyBands*, and prioritized in the order of *requestedFrequencyBands*, (i.e. first include remaining band combinations containing the first-listed band, then include remaining band combinations containing the second-listed band, and so on), including non-CA combinations, target for being included in *supportedBandCombination-r13*:

- include all CA band combinations whose supported number of CCs in the maximum number for both UL and DL among all the band combinations supported by the UE.

- For each CA band combination to be included in *supportedBandCombination-r13*, if there are fallback band combinations not supported by the UE:

- include the fallback band combinations in *non-SupportedBandCombinationChild* within *supportedBandCombination-r13*;

- For each CA band combination to be included in *supportedBandCombination-r13*, if there are fallback band combinations supported by the UE, whose band combination parameters are different from the CA band combination:

- include the fallback band combinations in *supportedBandCombinationChildExt* with the different band combination parameters within *supportedBandCombination-r13*;

4> else:

5> create a set of band combinations supported by the UE, including non-CA combinations, target for being included in *supportedBandCombination-r13*:

- include all CA band combinations whose supported number of CCs in the maximum number for both UL and DL among all the band combinations supported by the UE.

- For each CA band combination to be included in *supportedBandCombination-r13*, if there are fallback band combinations not supported by the UE:

- include the fallback band combinations in *non-SupportedBandCombinationChild* within *supportedBandCombination-r13*;

- For each CA band combination to be included in *supportedBandCombination-r13*, if there are fallback band combinations supported by the UE, whose band combination parameters are different from the CA band combination:

- include the fallback band combinations in *supportedBandCombinationChildExt* with the different band combination parameters within *supportedBandCombination-r13*;

FIG.22

| 5.6.3.1 General |
|---|
| 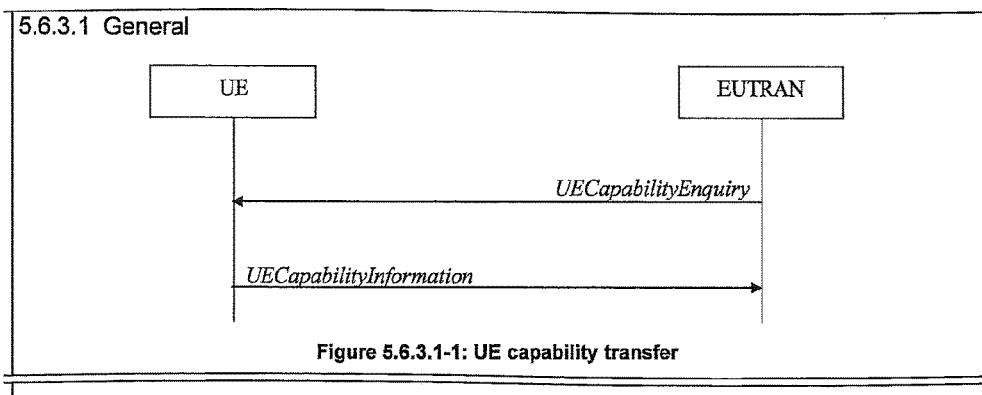  Figure 5.6.3.1-1: UE capability transfer |

| 5.6.3.3 Reception of the *UECapabilityEnquiry* by the UE |
|---|
| The UE shall: |

> 5> if the UE supports *requestReducedFormat* and UE supports *skipFallbackCombinations* and *UECapabilityEnquiry* message includes *requestSkipFallbackComb*:
>
> > 6> set *skipFallbackCombRequested* to *true*;
> >
> > 6> include CA band combinations with the highest supported number of DL and UL carriers first;
> >
> > 6> if a band combination (including 2DL+1UL CA band combinations) is the fallback band combination as specified in TS 36.306 [5] of an already-included band combination:
> >
> > > 7> exclude this band combination from the supported band combination list;
> > >
> > > 7> if the capabilities of this band combination are different from the already-included band combination whose fallback case this band combination is, include the *differentFallbackSupported* in the already-included band combination whose fallback case this band combination is;
>
> 5> else if the UE supports *requestReducedFormat* and UE supports *diffFallbackCombReport* and *UECapabilityEnquiry* message includes *requestDiffFallbackCombList*:
>
> > 6> for each CA band combination indicated in *requestDiffFallbackCombList*, include its fallback band combinations for which the capabilities are different from the band combination indicated in *requestDiffFallbackCombList*;
> >
> > 6> include CA band combinations with the highest supported number of DL and UL carriers whose fallback combinations with different capabilities are to be reported, into *requestedDiffFallbackCombList*;
>
> 4> if the *UECapabilityEnquiry* message includes *requestReducedFormat* and UE supports *requestReducedFormat*:
>
> > 5> include in *supportedBandCombinationReduced* as many as possible of the band combinations supported by the UE, including the non-CA combinations, determined according to the rules and priority order defined above;
>
> 4> else

FIG.23A

```
-          UECapabilityEnquiry

The UECapabilityEnquiry message is used to request the transfer of UE radio access capabilities for E-UTRA as well
as for other RATs.

Signalling radio bearer: SRB1

RLC-SAP: AM

Logical channel: DCCH

Direction: E-UTRAN to UE

UECapabilityEnquiry message

-- ASN1START

UECapabilityEnquiry ::=           SEQUENCE {
    rrc-TransactionIdentifier         RRC-TransactionIdentifier,
    criticalExtensions                CHOICE {
        c1                                CHOICE {
            ueCapabilityEnquiry-r8             UECapabilityEnquiry-r8-IEs,
            spare3 NULL, spare2 NULL, spare1 NULL
        },
        criticalExtensionsFuture          SEQUENCE {}
    }
}

UECapabilityEnquiry-r8-IEs ::=    SEQUENCE {
    ue-CapabilityRequest              UE-CapabilityRequest,
    nonCriticalExtension              UECapabilityEnquiry-v8a0-IEs        OPTIONAL
}
```

```
UECapabilityEnquiry-v1180-IEs ::=    SEQUENCE {
    requestedFrequencyBands-r11          SEQUENCE (SIZE (1..16)) OF FreqBandIndicator-r11
                OPTIONAL,
    nonCriticalExtension                 UECapabilityEnquiry-v1310-IEs
    OPTIONAL
}

UECapabilityEnquiry-v1310-IEs ::=    SEQUENCE {
    requestReducedFormat-r13             ENUMERATED {true}                OPTIONAL,   -- Need ON
    requestSkipFallbackComb-r13          ENUMERATED {true}                OPTIONAL,   -- Need ON
    requestedMaxCCsDL-r13                INTEGER (2..32)                  OPTIONAL,   -- Need ON
    requestedMaxCCsUL-r13                INTEGER (2..32)                  OPTIONAL,   -- Need ON
    requestReducedIntNonContComb-r13     ENUMERATED {true}                OPTIONAL,   -- Need ON
    nonCriticalExtension                 UECapabilityEnquiry-v14xy-IEs    OPTIONAL
}

UECapabilityEnquiry-v14xy-IEs ::=    SEQUENCE {
    requestDiffFallbackCombList-r14      RequestDiffFallbackCombList-r14   OPTIONAL,   -- Need ON
    nonCriticalExtension                 SEQUENCE {}                       OPTIONAL
}

UE-CapabilityRequest ::=             SEQUENCE (SIZE (1..maxRAT-Capabilities)) OF RAT-Type RequestDiffFallbackCombList-r14 ::= SEQUENCE (SIZE (1..maxBandComb-r13)) OF RequestDiffFallbackComb-
r14

RequestDiffFallbackComb-r14 ::= SEQUENCE(SIZE (1..max3imultaneousBands-r10)) OF
RequestBandParameters-r14

RequestBandParameters-r14 ::= SEQUENCE {
    bandEUTRA-r14               FreqBandIndicator-r11,
    ca-BandwidthClassDL-r14            CA-BandwidthClass-r14      OPTIONAL,
    ca-BandwidthClassUL-r14            CA-BandwidthClass-r14      OPTIONAL,
}

CA-BandwidthClass-r14 ::= ENUMERATED {a, b, c, d, e, f, ...}

-- ASN1STOP
```

FIG.23B

| UECapabilityEnquiry field descriptions |
| --- |
| *requestDiffFallbackCombList* <br> List of CA band combinations for which the UE indicated *differentFallbackSupported* and is requested to provide different capabilities for their fallback band combinations. |
| *requestReducedFormat* <br> Indicates that the UE if supported is requested to provide supported CA band combinations in the *supportedBandCombinationReduced-r13* instead of the *supportedBandCombination-r10*. The E-UTRAN includes this field if *requestSkipFallbackComb* or *requestDiffFallbackCombList* is included in the message. |
| *requestSkipFallbackComb* <br> Indicates that the UE shall explicitly exclude fallback CA band combinations in capability signalling. |
| *ue-CapabilityRequest* <br> List of the RATs for which the UE is requested to transfer the UE radio access capabilities i.e. E-UTRA, UTRA, GERAN-CS, GERAN-PS, CDMA2000. |
| *requestedFrequencyBands* <br> List of frequency bands for which the UE is requested to provide supported CA band combinations and non CA bands. |
| *requestedMaxCCsDL, requestedMaxCCsUL* <br> Indicates the maximum number of CCs for which the UE is requested to provide supported CA band combinations and non-CA bands. |
| *requestReducedIntNonContComb* <br> Indicates that the UE shall explicitly exclude supported intra-band non-contiguous CA band combinations other than included in capability signalling as specified in TS 36.306 [5, 4.3.5.21]. |

FIG.24

```
                    UE-EUTRA-Capability information element
-- ASN1START

UE-EUTRA-Capability ::=        SEQUENCE {
    accessStratumRelease           AccessStratumRelease,
    ue-Category                    INTEGER (1..5),
    pdcp-Parameters                PDCP-Parameters,
```

```
UE-EUTRA-Capability-v1320-IEs ::= SEQUENCE {
    ce-Parameters-v1320             CE-Parameters-v1320                      OPTIONAL,
    phyLayerParameters-v1320        PhyLayerParameters-v1320                 OPTIONAL,
    rf-Parameters-v1320             RF-Parameters-v1320                      OPTIONAL,
    fdd-Add-UE-EUTRA-Capabilities-v1320 UE-EUTRA-CapabilityAddXDD-Mode-v1320 OPTIONAL,
    tdd-Add-UE-EUTRA-Capabilities-v1320 UE-EUTRA-CapabilityAddXDD-Mode-v1320 OPTIONAL,
    nonCriticalExtension            ' UE-EUTRA-Capability-v14xy-IEs          OPTIONAL UE-EUTRA-Capability-v14xy-IEs ::= SEQUENCE {
    rf-Parameters-v14xy             RF-Parameters-v14xy                      OPTIONAL,
    nonCriticalExtension            SEQUENCE {}                              OPTIONAL
}
```

```
RF-Parameters-v1320 ::=        SEQUENCE {
    supportedBandListEUTRA-v1320        SupportedBandListEUTRA-v1320         OPTIONAL,
    supportedBandCombination-v1320      SupportedBandCombination-v1320       OPTIONAL,
    supportedBandCombinationAdd-v1320   SupportedBandCombinationAdd-v1320    OPTIONAL,
    supportedBandCombinationReduced-v1320 SupportedBandCombinationReduced-v1320 OPTIONAL
}

RF-Parameters-v14xy ::=        SEQUENCE {
    eNB-RequestedParameters-v14xy       SEQUENCE {
        requestedDiffFallbackCombList-r14     RequestedDiffFallbackCombList-r14
    }                                                                        OPTIONAL,
    diffFallbackCombReport-r14          ENUMERATED {supported}               OPTIONAL,
    supportedBandCombinationReduced-r14 SupportedBandCombinationReduced-r14  OPTIONAL
}

RequestedDiffFallbackCombList-r14 ::=  SEQUENCE (SIZE (1..maxBandComb-r13)) OF
RequestDiffFallbackComb-r14

SupportedBandCombination-r10 ::= SEQUENCE (SIZE (1..maxBandComb-r10)) OF BandCombinationParameters-
r10
```

```
BandCombinationParameters-r14 ::=   SEQUENCE {
    bandParameterList-r14               SEQUENCE (SIZE (1..maxSimultaneousBands-r10)) OF BandParameters-
r14,
    supportedBandwidthCombinationSet-r14    SupportedBandwidthCombinationSet-r10    OPTIONAL,
    multipleTimingAdvance-r14           ENUMERATED {supported}               OPTIONAL,
    simultaneousRx-Tx-r14               ENUMERATED {supported}               OPTIONAL,
    bandInfoEUTRA-r14                   BandInfoEUTRA,
    dc-Support-r14                      SEQUENCE {
        asynchronous-r14                ENUMERATED {supported}               OPTIONAL,
        supportedCellGrouping-r14       CHOICE {
            threeEntries-r14                BIT STRING (SIZE(3)),
            fourEntries-r14                 BIT STRING (SIZE(7)),
            fiveEntries-r14                 BIT STRING (SIZE(15))
        }                                                                    OPTIONAL
    }                                                                        OPTIONAL,
    supportedNAICS-2CRS-AP-r14      BIT STRING (SIZE (1..maxNAICS-Entries-r12)) OPTIONAL,
    commSupportedBandsPerBC-r14     BIT STRING (SIZE (1.. maxBands))         OPTIONAL,
    additionalRx-Tx-PerformanceReq-r14  ENUMERATED {supported}               OPTIONAL
}

SupportedBandwidthCombinationSet-r10 ::=   BIT STRING (SIZE (1..maxBandwidthCombSet-r10))
```

```
BandParameters-v1320 ::= SEQUENCE {
    bandParametersDL-v1320          MIMO-CA-ParametersPerBoBC-r13
}

BandParameters-r14 ::= SEQUENCE {
    bandEUTRA-r14                   FreqBandIndicator-r11,
    bandParametersUL-r14            BandParametersUL-r13                     OPTIONAL,
    bandParametersDL-r14            BandParametersDL-r14                     OPTIONAL,
    supportedCSI-Proc-r14           ENUMERATED {n1, n3, n4}                  OPTIONAL,
}

BandParametersUL-r10 ::= SEQUENCE (SIZE (1..maxBandwidthClass-r10)) OF CA-MIMO-ParametersUL-r10
```

```
BandParametersDL-r13 ::= CA-MIMO-ParametersDL-r13

BandParametersDL-r14 ::= SEQUENCE {
    ca-MIMO-ParametersDL-r14        CA-MIMO-ParametersDL-r13                 OPTIONAL,
    mimo-CA-ParametersPerBoBc-r14   MIMO-CA-ParametersPerBoBC-r13            OPTIONAL
}

CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10                    OPTIONAL
}
```

```
FreqBandIndicatorListEUTRA-r12 ::=     SEQUENCE (SIZE (1..maxBands)) OF FreqBandIndicator-r11

-- ASN1STOP
```

FIG.25

```
                        UECapabilityInformation message
-- ASN1START

UECapabilityInformation ::=         SEQUENCE {
    rrc-TransactionIdentifier           RRC-TransactionIdentifier,
    criticalExtensions                  CHOICE {
        c1                                  CHOICE{
            ueCapabilityInformation-r8          UECapabilityInformation-r8-IEs,
            ueCapabilityInformation-r14         UECapabilityInformation-r14-IEs,
            spare6 NULL, spare5 NULL, spare4 NULL,
            spare3 NULL, spare2 NULL, spare1 NULL
        },
        criticalExtensionsFuture            SEQUENCE {}
    }
}
```

```
UECapabilityInformation-r14-IEs ::= SEQUENCE {
    ue-DiffFallbackComb-r14         UE-DiffFallbackComb-r14             OPTIONAL,
    nonCriticalExtension            SEQUENCE {}                         OPTIONAL
}

UE-DiffFallbackComb-r14 ::=         SEQUENCE {
    eNB-RequestedParameters-v14xy       SEQUENCE {
        requestedDiffFallbackCombList-r14       RequestedDiffFallbackCombList-r14
                                                                            OPTIONAL,
    }
    supportedBandCombinationReduced-r14     SupportedBandCombinationReduced-r14  OPTIONAL
}

RequestedDiffFallbackCombList-r14 ::=   SEQUENCE (SIZE (1..maxBandComb-r13)) OF
RequestDiffFallbackComb-r14

SupportedBandCombinationReduced-r14 ::= SEQUENCE (SIZE (1..maxBandComb-r13)) OF
BandCombinationParameters-r14

BandCombinationParameters-r14 ::=   SEQUENCE {
    bandParameterList-r14               SEQUENCE (SIZE (1..maxSimultaneousBands-r10)) OF BandParameters-
r14,
    supportedBandwidthCombinationSet-r14    SupportedBandwidthCombinationSet-r10   OPTIONAL,
    multipleTimingAdvance-r14           ENUMERATED {supported}              OPTIONAL,
    simultaneousRx-Tx-r14               ENUMERATED {supported}              OPTIONAL,
    bandInfoEUTRA-r14                   BandInfoEUTRA,
    dc-Support-r14                      SEQUENCE {
        asynchronous-r14                    ENUMERATED {supported}              OPTIONAL,
        supportedCellGrouping-r14           CHOICE {
            threeEntries-r14                    BIT STRING (SIZE(3)),
            fourEntries-r14                     BIT STRING (SIZE(7)),
            fiveEntries-r14                     BIT STRING (SIZE(15))
        }                                                                       OPTIONAL
    }                                                                       OPTIONAL,
    supportedNAICS-2CRS-AP-r14          BIT STRING (SIZE (1..maxNAICS-Entries-r12)) OPTIONAL,
    commSupportedBandsPerBC-r14         BIT STRING (SIZE (1.. maxBands))    OPTIONAL,
    additionalRx-Tx-PerformanceReq-r14  ENUMERATED {supported}              OPTIONAL
}

BandParameters-r14 ::= SEQUENCE {
    bandEUTRA-r14                       FreqBandIndicator-r11,
    bandParametersUL-r14                BandParametersUL-r13                OPTIONAL,
    bandParametersDL-r14                BandParametersDL-r14                OPTIONAL,
    supportedCSI-Proc-r14               ENUMERATED {n1, n3, n4}             OPTIONAL
}

BandParametersDL-r14 ::= SEQUENCE {
    ca-MIMO-ParametersDL-r14            CA-MIMO-ParametersDL-r13            OPTIONAL,
    mimo-CA-ParametersPerBoBc-r14       MIMO-CA-ParametersPerBoBC-r13       OPTIONAL
}

-- ASN1STOP
```

FIG.26

```
                    UE-EUTRA-Capability information element
-- ASN1START

UE-EUTRA-Capability ::=         SEQUENCE {
    accessStratumRelease            AccessStratumRelease,
    ue-Category                     INTEGER (1..5), UE-EUTRA-Capability-v1320-IEs ::= SEQUENCE {
    ce-Parameters-v1320             CE-Parameters-v1320                 OPTIONAL,
    phyLayerParameters-v1320        PhyLayerParameters-v1320            OPTIONAL,
    rf-Parameters-v1320             RF-Parameters-v1320                 OPTIONAL,
    fdd-Add-UE-EUTRA-Capabilities-v1320 UE-EUTRA-CapabilityAddXDD-Mode-v1320 OPTIONAL,
    tdd-Add-UE-EUTRA-Capabilities-v1320 UE-EUTRA-CapabilityAddXDD-Mode-v1320 OPTIONAL,
    nonCriticalExtension            UE-EUTRA-Capability-v14xy-IEs       OPTIONAL UE-EUTRA-Capability-v14xy-IEs ::= SEQUENCE {
    rf-Parameters-v14xy             RF-Parameters-v14xy                 OPTIONAL,
    nonCriticalExtension            SEQUENCE {}                         OPTIONAL
}

RF-Parameters-v1320 ::=         SEQUENCE {
    supportedBandListEUTRA-v1320        SupportedBandListEUTRA-v1320        OPTIONAL,
    supportedBandCombination-v1320      SupportedBandCombination-v1320      OPTIONAL,
    supportedBandCombinationAdd-v1320   SupportedBandCombinationAdd-v1320   OPTIONAL,
    supportedBandCombinationReduced-v1320 SupportedBandCombinationReduced-v1320 OPTIONAL
}

RF-Parameters-v14xy ::=         SEQUENCE {
    diffFallbackCombReport-r14          ENUMERATED {supported}              OPTIONAL
}

SupportedBandCombination-r10 ::= SEQUENCE (SIZE (1..maxBandComb-r10)) OF BandCombinationParameters-
r10

FreqBandIndicatorListEUTRA-r12 ::=    SEQUENCE (SIZE (1..maxBands)) OF FreqBandIndicator-r11

-- ASN1STOP
```

USER EQUIPMENT, BASE STATION, INFORMATION REPORTING METHOD, AND INFORMATION RECEIVING METHOD

TECHNICAL FIELD

The present invention relates to a technique for user equipment UE of a radio communication system, such as LTE, to report its capability information to a base station eNB.

BACKGROUND ART

In LTE-Advanced, in order to achieve a throughput exceeding that of LTE while maintaining backward compatibility with LTE, carrier aggregation (CA: Carrier Aggregation) has been adopted such that communication is performed by simultaneously using a plurality of carriers while using a bandwidth (up to 20 MHz) supported by LTE as a basic unit. For carrier aggregation, a carrier that is a basic unit is referred to as a component carrier (CC: Component Carrier).

The carrier aggregation is classified into three scenarios depending on frequency allocations, as illustrated in FIG. 1A, FIG. 1B, and FIG. 1C. FIG. 1A is the Intra-band contiguous CA, which is a scenario such that CCs that are contiguous within the band are to be allocated. This scenario is applied, for example, to a case where a wideband allocation, such as the 3.5 GHz band, is performed. FIG. 1B is the Inter-band non-contiguous CA where a plurality of CCs of different bands are arranged. This scenario is applied, for example, for a case where communication is performed by using a plurality of carriers, such as a 2 GHz band and a 1.5 GHz band. FIG. 1C is the Intra-band non-contiguous CA, which is a scenario where non-contiguous CCs within the same band are to be allocated. This scenario can be applied, for example, to a case where allocation of a frequency band to an operator is fragmented.

It is specified in the LTE system (which includes LTE-Advanced) that user equipment UE reports, for example, during connection to a network, its capability (Capability) to a base station eNB by a predetermined signaling message (UE-EUTRA-Capability) (Non-Patent Document 1).

PRIOR ART DOCUMENT

Non-Patent Document

Non-Patent Document 1: 3GPP TS36.331 V12.6.0 (2015-06)

Non-Patent Document 2: 3GPP TS36.101 V13.0.0 (2015-07)

SUMMARY OF INVENTION

Problem to be Solved by the Invention

In the above-described reporting of the capability information, the user equipment UE reports a combination of bands supported in the CA by itself (CA band combination, CA band combination) to the base station eNB. Furthermore, currently, it is specified that, if the user equipment UE can support a plurality of types of CA band combinations, the user equipment UE reports all patterns of the supported CA band combinations to the base station eNB.

FIG. 2 illustrates a configuration example of a message for reporting a CA band combination. As illustrated in FIG. 2, for each CA band combination, various types of parameters can be reported individually for UL/DL by the message; and, furthermore, for each band of a CA band combination, various types of parameters can be reported. FIG. 3A shows an example of parameters that can be configured for each CA band combination; and FIG. 3B shows an example of parameters that can be reported for each band in the CA band combination. For example, the "dc-Support" is a parameter that indicates that the user equipment supports Dual Connectivity (which is referred to as "DC," hereinafter). The "supportCSI-Proc" is a parameter indicating a CSI (Channel State Information) process number that can be supported by the user equipment. The "CA bandwidthclass" is a parameter indicating bandwidth classes (for each of UL/DL) that can be supported by the user equipment. The supported MIMO-Capability is a parameter indicating a number of MIMO layers (for each of UL/DL) that can be supported by the user equipment.

The CSI process number is a maximum operable process number for calculating the CSI in user equipment; and it is used for reporting the CSI to a base station for CoMP (Coordinated Multi-point).

The CA bandwidthclass is a class defined by the table (Non-Patent Document 2) of FIG. 4; and it indicates, for each frequency band, a bandwidth and the number of CCs that can be aggregated in the user equipment UE. For example, it is described in the standard specification that, for the frequency bands of 2 GHz (Band 1) and 1.5 GHz (Band 21), the maximum number of CCs is 1 for each band, the maximum bandwidth that can be aggregated is 100 RBs; and, for the inter-band CA with 2 CCs, 1A_21A.

In FIG. 5A and FIG. 5B, a specific example of a signaling message for reporting a CA band combination is illustrated. FIG. 5A and FIG. 5B show one signaling message as a whole. The example illustrated in FIG. 5A and FIG. 5B is for the downlink only CA of 2 G+1.5 G, which is an example for reporting the capability to perform the downlink 2×2 MIMO. In the example illustrated in FIG. 5A and FIG. 5B, four types of patterns are reported from a pattern for performing downlink CA with two bands to a pattern for using 1.5 G alone.

FIG. 6 shows the CA band combination to be reported when the user equipment UE supports up to 3DL/3UL CA. Note that the four CA band combinations (BandCombinationParameters-r10) shown in FIG. 5A and FIG. 5B correspond, from the top, to "No. 13," "No. 14," "No. 18," and "No. 19" of FIG. 6, respectively.

Here, a band combination lower than the 3DL/3UL that is the maximum CA capability (the number of CCs is less in any one of or both the DL and UL) is said to be a fallback band combination (Fallback band combination). In the example of FIG. 6, since 3DL/3UL as well as all the fallback band combinations of it are supported, the user equipment UE reports 19 CA band combinations in total to the base station eNB. Note that "A" shown in each band of each of the CA band combinations of FIG. 6 represents the CA bandwidthclass in the band. Note that, if the CA is not to be executed (Non-CA, No. 17-No. 19), it is specified to report it as a subset of the CA. Furthermore, as described above, in the CA band combination, various types of parameters can be reported. FIG. 7 illustrates an example of reporting parameters related to the number of MIMO layers; and, for each band of each of the CA combinations, the number of the MIMO layers that can be supported by the user equipment is indicated.

As described above, in the related art, the user equipment UE is required to report all the CA band combinations supported by itself, so that the number of the CA band combinations to be reported increases, as the number of CCs to be bundled increases. In Rel. 13 of LTE, in order to achieve more flexible and high-speed radio communication, CA has been studied where up to 32 CCs are to be bundled. Thus, there is a problem that, when the related art is applied as it is, the number of the CA band combinations to be reported becomes enormous, and the signal amount (information amount) for signaling also becomes enormous.

The present invention has been achieved in view of the above-described point, and an object is to provide a technique for reducing a signal amount for reporting the capability of the CA band combination to the base station by user equipment, in a radio communication system performing carrier aggregation.

Means for Solving the Problem

According to an embodiment of the present invention, there is provided user equipment for communicating with a base station in a radio communication system supporting carrier aggregation, the user equipment including a generator that generates band combination information indicating one or more band combinations capable of being used for the carrier aggregation in the user equipment; and a transmitter that transmits the generated band combination information to the base station, wherein the generator generates the band combination information including highest band combination information indicating a highest band combination having a largest number of component carriers, CCs, to be combined, among the one or more band combinations capable of being used for the carrier aggregation in the user equipment.

Furthermore, according to an embodiment of the present invention, there is provided a base station for communicating with user equipment in a radio communication system supporting carrier aggregation, the base station including a receiver that receives, from the user equipment, band combination information indicating one or more band combinations for the carrier aggregation; and a determination unit that determines a band combination capable of being used in the user equipment depending on the one or more band combinations included in the band combination information received by the receiver, wherein, upon detecting that the band combination information includes highest band combination information indicating a highest band combination having a largest number of component carriers, CCs, to be combined, among the one or more band combinations capable of being used for the carrier aggregation in the user equipment, the determination unit determines that the user equipment is capable of using the highest band combination and all band combinations, each having a number of CCs that is less than the number of CCs in the highest band combination.

Advantage of the Invention

According to the embodiments of the present invention, in the radio communication system performing the carrier aggregation, a signal amount for the user equipment to report capability of the CA band combination to the base station can be reduced.

BRIEF DESCRIPTION OF DRAWINGS

FIG. 3A is a diagram for illustrating various types of parameters in the CA band combination;

FIG. 3B is a diagram for illustrating the various types of the parameters in the CA band combination;

FIG. 4 is a table showing CA-BandwidthClass;

FIG. 9 is a diagram illustrating a specific example of 19 types of the CA band combinations in total, where the 3DL/3UL is a highest;

FIG. 10 is a diagram illustrating a specific example of the CA band combinations where parameters are different;

FIG. 15 is a diagram illustrating an example of a UECapabilityEnquiry message;

FIG. 17 is a diagram illustrating an example of UE-EUTRA-Capability Information Element;

FIG. 18 is a diagram illustrating an example of the UE-EUTRA-Capability Information Element;

FIG. 19 is a description of a processing procedure for generating the CA band combination information;

FIG. 22 is a diagram illustrating a specification change example illustrating an operation of a RRC layer according to the modified example 1;

FIG. 23A is a diagram illustrating a specification change example of UE CapabilityEnquiry according to the modified example 1;

FIG. 23B is a diagram illustrating a specification change example of the UE Capability Enquiry according to the modified example 1;

FIG. 24 is a diagram illustrating a specification change example (version 1) of UE-EUTRA-Capability according to the modified example 1;

FIG. 25 is a diagram illustrating a specification change example of UECapabilityInformation according to the modified example 1; and FIG. 26 is a diagram illustrating a specification change example (version 2) of the UE-EUTRA-Capability according to the modified example 1.

EMBODIMENTS OF THE INVENTION

Figure 1A:
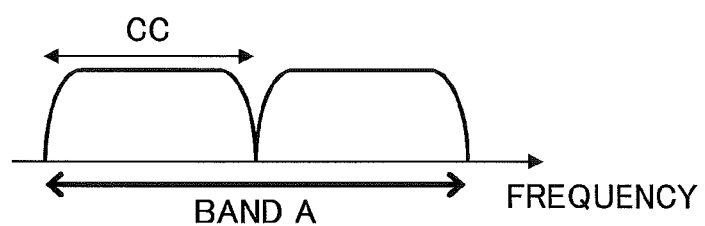
FIG. 1A is a diagram illustrating an example of a frequency allocation of carrier aggregation.
Figure 1B:
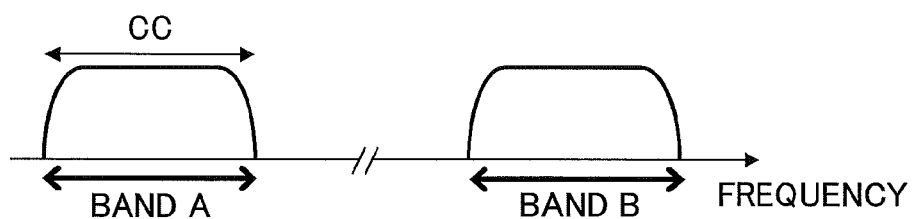
FIG. 1B is a diagram illustrating an example of the frequency allocation of the carrier aggregation.
Figure 1C:
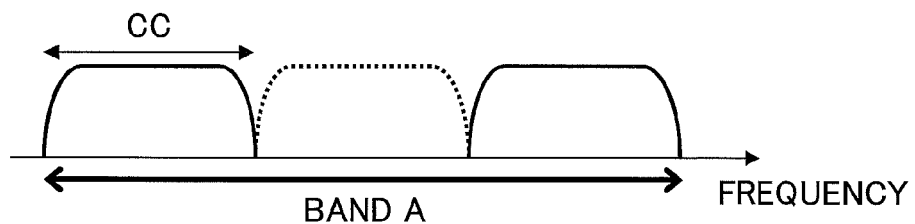
FIG. 1C is a diagram illustrating an example of the frequency allocation of the carrier aggregation.
Figure 2:
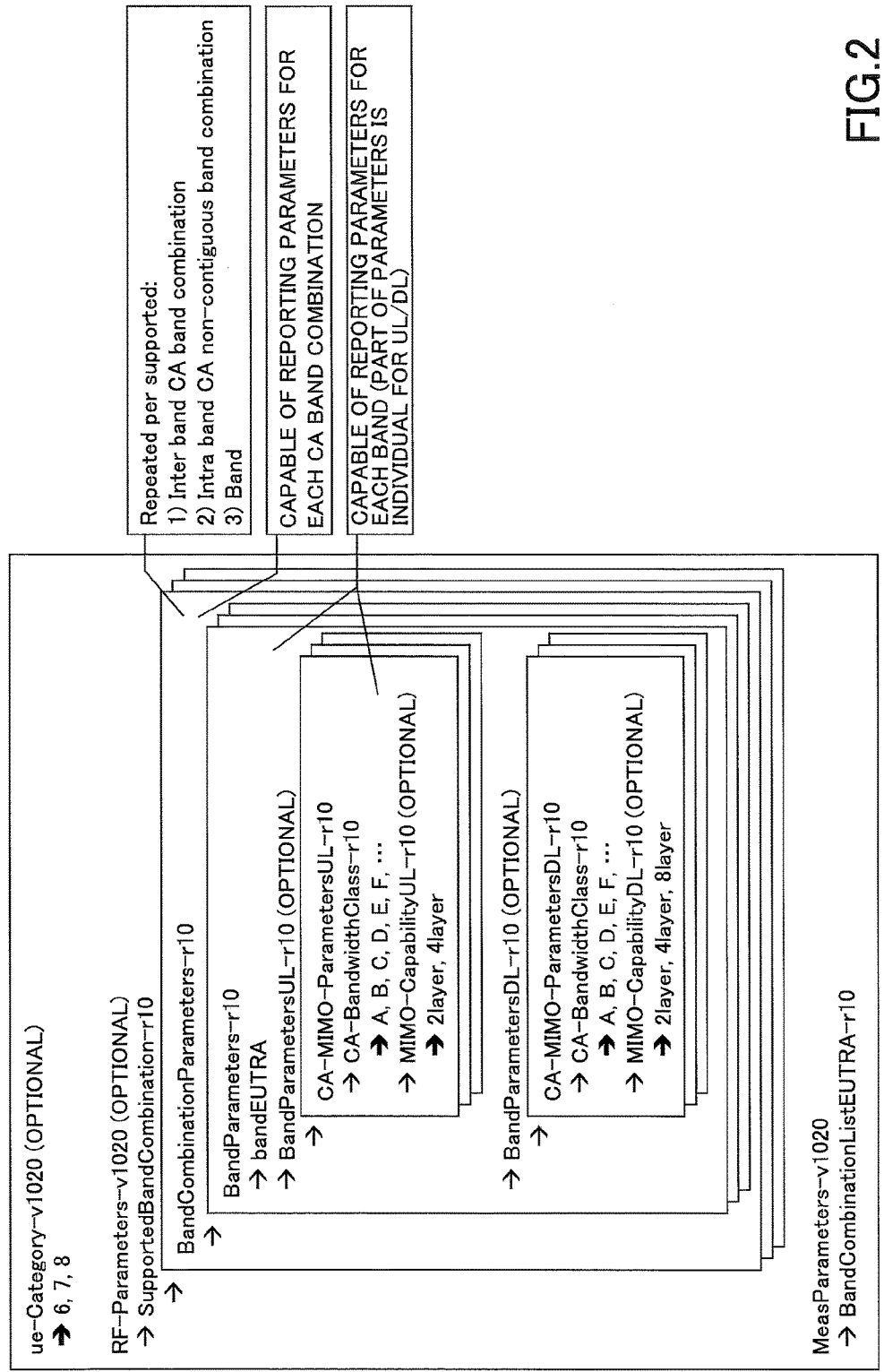
FIG. 2 is a diagram illustrating an example of a message structure for reporting CA band combination information.
Figure 5A:
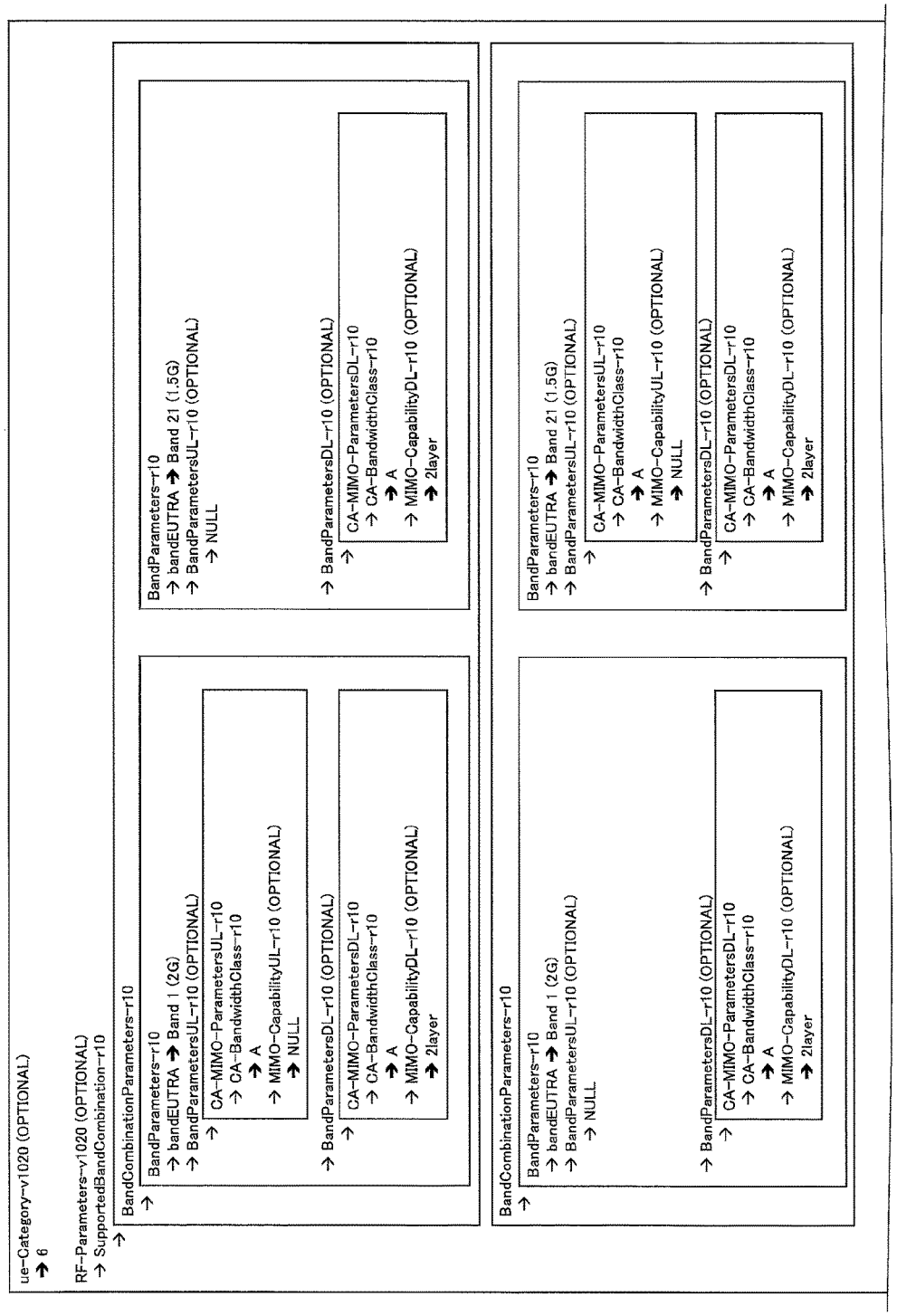
FIG. 5A is a diagram illustrating a specific example of a signaling message for reporting CA band combination information.
Figure 5B:
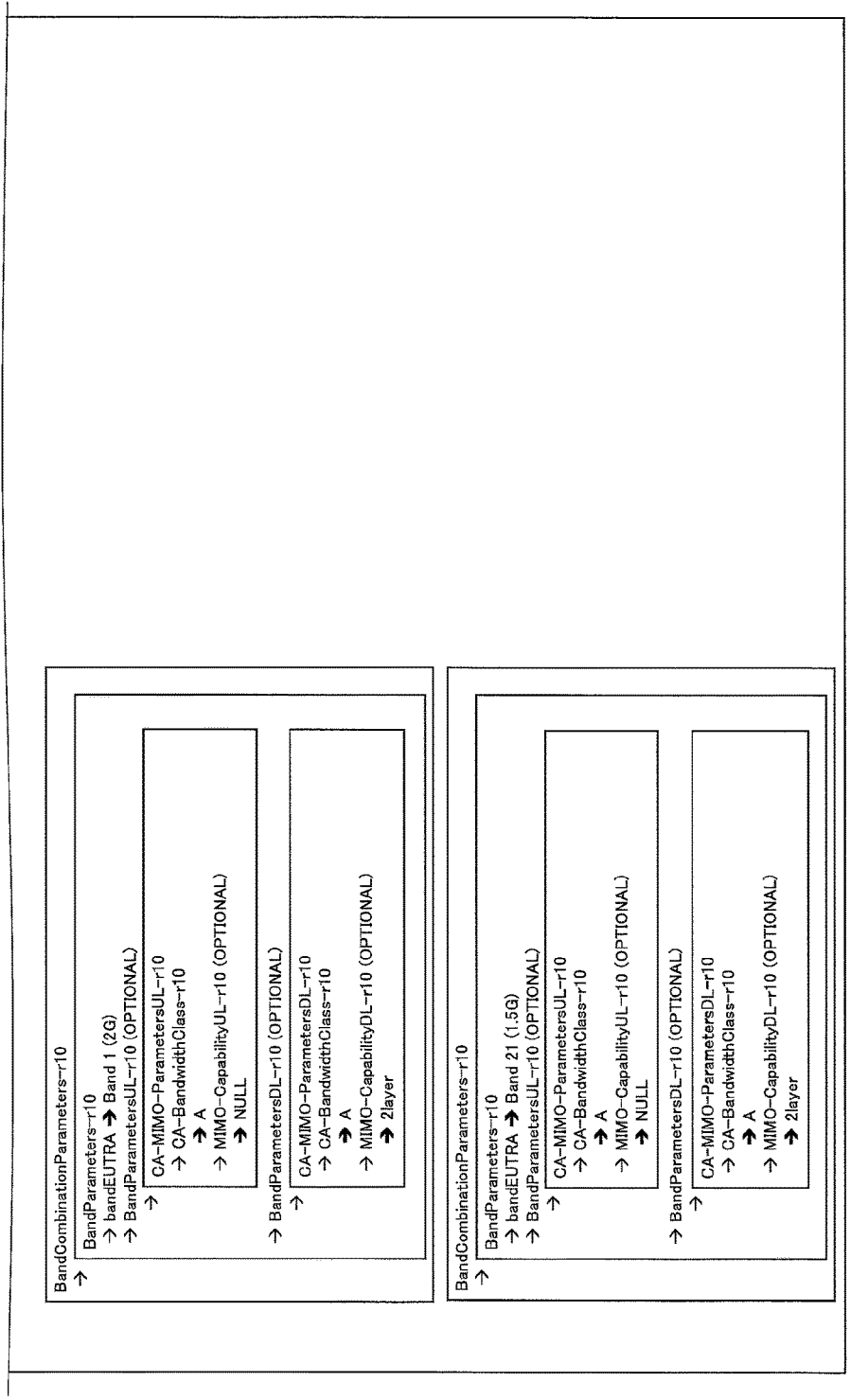
FIG. 5B is a diagram illustrating the specific example of the signaling message for reporting the CA band combination information.
Figure 6:
FIG. 6 is a diagram showing information to be reported as the CA band combination when user equipment UE support up to 3DL/3UL CA.

An embodiment of the present invention is described below by referring to the drawings. Note that the embodiments described below is merely an example, and the embodiments to which the present invention is applied is not limited to the following embodiments. For example, a communication system according to the embodiment is assumed to support LTE including LTE-Advanced; however, the present invention is not limited to LTE, and it can be applied to another scheme that executes CA. In the following, "LTE" is used in meaning that includes LTE-Advanced, except as indicated other wise.

<Overall Configuration of the System, Operation Example>

Figures 7, 8:
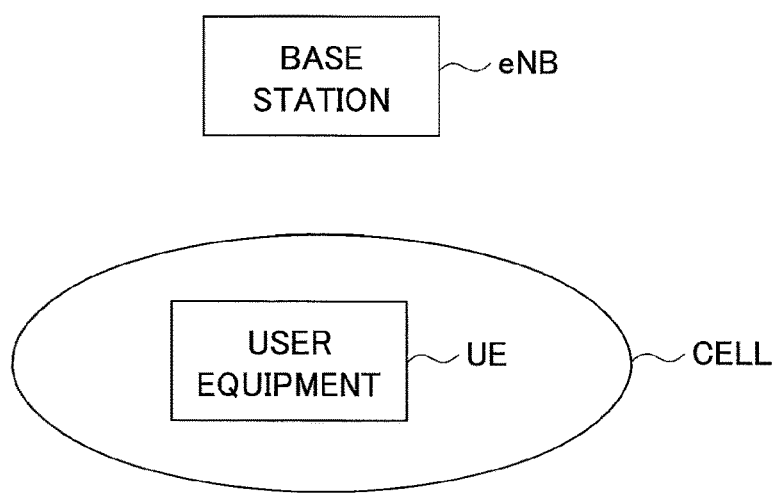
FIG. 7 is a diagram illustrating an example of a MIMO layer number to be reported for each band in the CA band combination.
FIG. 8 is a configuration diagram of a radio communication system according to an embodiment of the present invention.

FIG. 8 illustrates a configuration diagram of a radio communication system according to the embodiment of the present invention. The communication system according to the embodiment is a communication system based on the LTE scheme; and, as illustrated in FIG. 8, it includes user equipment UE and a base station eNB. The user equipment UE and the base station eNB are capable of executing CA. In FIG. 8, one user equipment UE and one base station eNB are illustrated; however, this is an example, and a plurality of each of them may be included. Furthermore, the user equipment UE may be provided with a capability (DC) for simultaneously executing communication with a plurality of base stations eNBs.

In the embodiment, the user equipment UE transmits, to the base station eNB, CA band combination information indicating a combination of bands that can be supported for the base station eNB. Note that, in the following, for a case where a combination of any bands is implied, "CA band combination" and "fallback band combination" are mainly used; and, for a case where information to be carried by a message is implied, "information indicating the CA band combination," "information indicating the fallback band combination," and so forth are mainly used.

In the embodiment, when the user equipment UE supports a CA band combination and all of its fallback band combinations, the user equipment UE omits reporting information indicating the fallback band combinations, and only reports information indicating the highest CA band combination. Furthermore, for various types of parameters (FIG. 3) in the CA band combination, only the various types of parameters in the highest CA band combination are to be reported.

Note that the highest CA band combination implies, among all the CA band combinations that can be supported by the user equipment UE, the CA band combination with the largest number of CCs to be combined both in UL and DL.

If information indicating a CA band combination is received from the user equipment UE and none of the information indicating its fallback band combination is received, the base station eNB determines that the user equipment UE supports, in addition to the received CA band combination, all of its fallback band combinations.

Note that, when the user equipment UE supports the Intra-band contiguous CA, and when the user equipment UE supports the CA bandwidthclass at a higher layer, it is deemed, in the embodiment, that the user equipment UE supports all the CA bandwidthclasses at lower layers. Specifically, when the user equipment UE supports all the CA bandwidthclasses of "A through F" in a predetermined frequency band, the user equipment UE reports "F" by the CA bandwidthclass with respect to the predetermined band in the CA band combination. The base station eNB determines that the user equipment UE supports all the CA bandwidthclasses of "A" through "F" in the predetermined band.

Next, when the user equipment UE supports a highest CA band combination, and when the user equipment UE does not support some of the fallback band combinations of all the fallback band combinations, the user equipment UE reports, in addition to the highest CA band combination, unsupported fallback band combinations to the base station eNB, in the embodiment.

When the base station eNB receives information indicating a CA band combination and information indicating unsupported CA band combinations from the user equipment UE, the base station eNB determines that, in addition to the received CA band combination, all the fallback band combinations other than the unsupported fallback band combinations are supported, among all of its fallback band combinations.

Furthermore, even if the user equipment UE supports a CA band combination and all of its fallback band combinations, a case can be assumed where a part of the fallback band combinations includes a fallback band combination that has a parameter that is different from that of the various types of parameters of the highest CA band combination (i.e., a case where there is a difference in parameters with the highest CA band combination). In this case the user equipment UE reports information indicating the fallback band combination in which only the different parameter among the various types of parameters are set. The base station eNB that receives information indicating the fallback band combination in which only the different parameter is set determines that the parameters that are not reported in the fallback band combination are the same as those of the highest CA band combination.

Specific Example

As an example, as shown in FIG. 9, a specific example is described for a set of all 19 types of CA band combinations with the 3DL/3UL as the highest. Note that, in the embodiment, CA for bundling up to 32 CCs is assumed, so that the highest CA band combination is 32DL/32UL; however, since the combination patterns are enormous, for convenience of illustration, it is described by using a set of CA band combinations with the 3DL/3UL as the highest.

Here, it is assumed that the user equipment UE supports all the 19 types of the CA band combinations; and that all the various types of parameters (the presence or absence of DC, the number of the MIMO layers, the CSI process number, etc.) are the same for respective CA band combinations.

In this case, the user equipment UE according to the embodiment reports, to the base station eNB, the CA band combination of No. 1 indicated by X in FIG. 9 (i.e., the highest CA band combination) and the CA band combination information in which only the various types of parameters in the CA band combination of No. 1 are set; and no reporting is performed for No. 2 through No. 19, which are the fallback band combinations of the CA band combination of No. 1.

As described above, the base station eNB that receives the information only on the CA band combination of No. 1 among No. 1 through No. 19 from the user equipment UE determines that all of No. 1 through 19 are supported in the user equipment UE. Furthermore, for the various types of parameters in each of the CA band combinations from No. 2 through 19, a determination is made that they are the same as the various types of parameters included in the information on the CA band combination of No. 1.

However, when the user equipment UE does not support No. 6 and No. 10 (Y and Z in FIG. 9) among the CA band combinations shown in FIG. 9, the user equipment UE transmits, to the base station eNB, the CA band combination information indicating that No. 6 and No. 10 are not supported.

In this case, since the base station eNB receives, in addition to the CA band combination information of No. 1, the CA band combination information indicating that No. 6 and No. 10 are not supported, the base station eNB determines that the user equipment UE supports the highest CA band combination (No. 1) and the fallback band combinations other than No. 6 and No. 10, among the fallback band combinations No. 2 through No. 19, which are its fallback band combinations, as described above.

Furthermore, a specific example is described for a case where there is a fallback band combination for the user equipment UE such that it includes a parameter that is different from that of the various types of parameters of the highest CA band combination, in a part of the fallback band combinations among all the fallback band combinations of the highest CA band combination. For example, as shown in FIG. 10, suppose that the user equipment UE supports, for each of 800 M, 1.5 G, and 2 G, 2-layer MIMO for the highest CA band combination; however, for the fallback band combination of No. 2, 4-layer MIMO is supported in 1.5 G, and for the fallback band combination of No. 4, 4-layer MIMO is supported in 2 G.

The user equipment UE further transmits, to the base station eNB, information indicating the fallback band combination in which parameters are set that indicate that, among the bands of No. 2, 4-layer MIMO is supported in 1.5 G; and that, among the bands of No. 4, 4-layer MIMO is supported in 2G. Note that, in the information indicating the fallback combination, parameters are not set that indicate that, among the bands in No. 2, 2-layer MIMO is supported in 800 M; and that, among the bands in No. 4, 2-layer MIMO is supported in 800 M.

In this case, the base station eNB receives, in addition to the information indicating the CA band combination of No. 1, information indicating the fallback band combination in which parameters are set that indicate that, among the bands of No. 2, 4-layer MIMO is supported in 1.5 G; and that, among the bands of No. 4, 4-layer MIMO is supported in 2G. The base station eNB determines that the user equipment UE supports all of No. 1 through No. 19; and that the 4-layer MIMO is supported in 1.5 G of No. 2, the 4-layer MIMO is supported in 2G of No. 4, and the other parameters are the same as the various types of parameters of No. 1.

Note that the above-described reporting methods can be combined. Namely, the user equipment UE may transmit, in addition to the information indicating the CA band combination of No. 1, information indicating the fallback band combination indicating that No. 6 and No. 10 are not supported; and information indicating the fallback band combination in which parameters are set that indicate that, among the bands of of the No. 2, the 4-layer MIMO is supported in 1.5 G, and, among the bands of No. 4, the 4-layer MIMO is supported in 2G.

In this case, the base station eNB determines that the user equipment UE supports the highest CA band combination (No. 1) and the fallback band combinations other than No. 6 and No. 10, among its fallback band combinations (No. 2 through No. 19); and that the user equipment UE supports the 4-layer MIMO in 1.5G of No. 2, the 4-layer MIMO in 2G of No. 4, and other parameters are the same as the various types of parameters of No. 1.

In the above description, the user equipment UE reports the highest CA band combination depending on its capability; however, it may be reported by filtering with a plurality of bands instructed from the base station eNB. For example, if it is instructed by the base station eNB to report only CA band combinations that can be combined in 800 M and 1.5 G, the user equipment UE may reports the highest CA band combination; unsupported fallback band combinations; and fallback band combinations having parameter differences, among the CA band combinations that can be combined in 800 M and 1.5 G.

After receiving the CA band combination information, the base station eNB determines which CA combination is to be applied among the CA combinations supported by the user equipment UE, for example, based on communication quality, etc. of each CC of the user equipment UE; and performs an operation, such as reporting (configuring) the determined CA combination to the user equipment UE.

In order to perform such an operation, for example, the base station eNB holds, for each of the highest CA band combinations, a table (example: FIG. 9) including the CA band combination and its fallback band combinations. Here, the highest CA band combination and its fallback band combinations may be any content as long as it can be uniquely determined between the user equipment UE and the base station eNB. For example, the fallback band combinations (No. 2 through No. 19) of the highest CA combination No. 1 illustrated in FIG. 9 are uniquely determined in the communication system; and the base station eNB recognizes the fallback band combinations (No. 2 through No. 19) corresponding to the highest CA combination No. 1.

<Functional Configuration>

(User Equipment)

Figure 11:
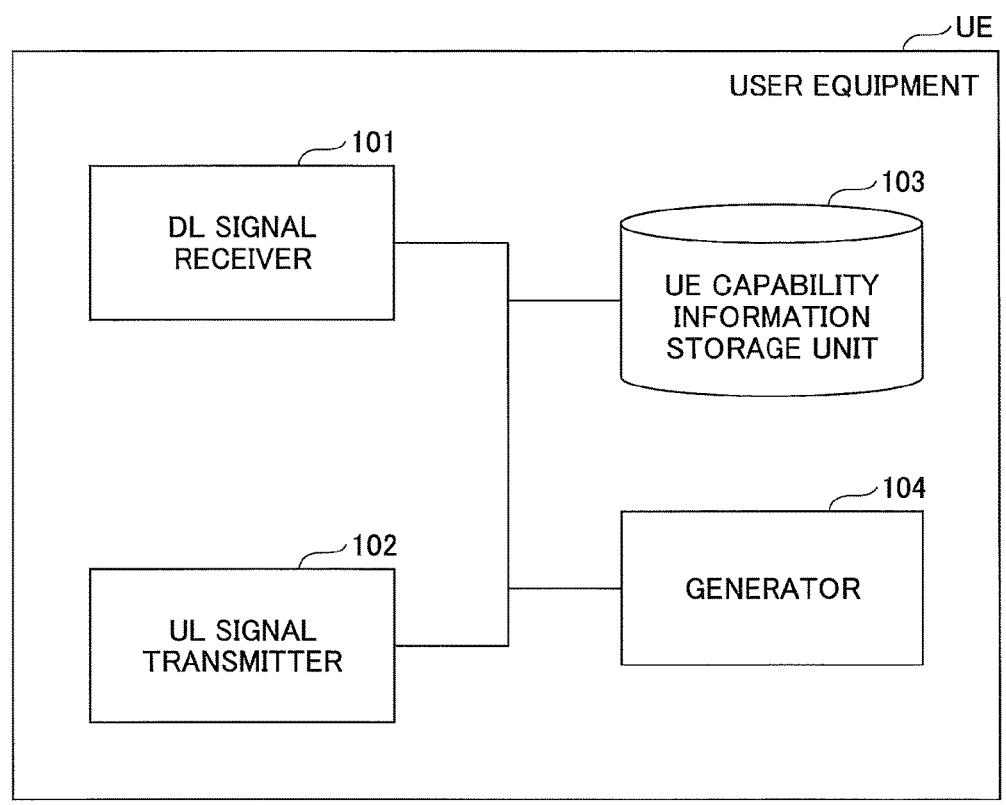
FIG. 11 is a functional configuration diagram of the user equipment UE according to the embodiment of the present invention.

FIG. 11 shows a functional configuration diagram of the user equipment UE according to the embodiment. As illustrated in FIG. 11, the user equipment UE includes a DL signal receiver 101; a UL signal transmitter 102; a UE capability information storage unit 103; and a generator 104. Note that FIG. 11 only illustrates, in the user equipment UE, the functional units particularly related to the present invention; and functions, which are not depicted, for performing at least operation conforming to LTE are also included.

The DL signal receiver 101 includes a function for receiving various types of downlink signals from the base station eNB, and for retrieving the higher layer information from the received physical layer signals; and the UL signal transmitter 102 includes a function for generating various types of physical layer signals from higher layer information to be transmitted from the user equipment UE, and for transmitting them to the base station eNB.

The UE capability information storage unit 103 stores UE capability information including the CA band combinations supported by the user equipment UE itself; and various types of parameters in the CA band combinations.

When the CA band combination information is to be transmitted to the base station eNB, the generator 104 refers to the UE capability information storage unit 103; and generates CA band combination information indicating the highest CA band combination, unsupported fallback band combinations, and fallback band combinations with parameter differences. Furthermore, the generator 104 instructs the UL signal transmitter 102 to transmit the generated CA band combination information to the base station eNB.

Note that, when a plurality of bands supported by the base station eNB is reported from the base station eNB, the generator 104 may generate CA band combination information indicating, among the plurality of bands, the highest CA band combination, unsupported fallback band combinations, and fallback band combinations with parameter differences.

Furthermore, the generator 104 may switch the format of the CA band combination information in accordance with an instruction from the base station eNB. For example, when the base station eNB does not support the format of the CA band combination information according to the embodiment, the CA band combination information may be generated in accordance with the usual format of the CA band combination information.

(Base Station)

Figure 12:
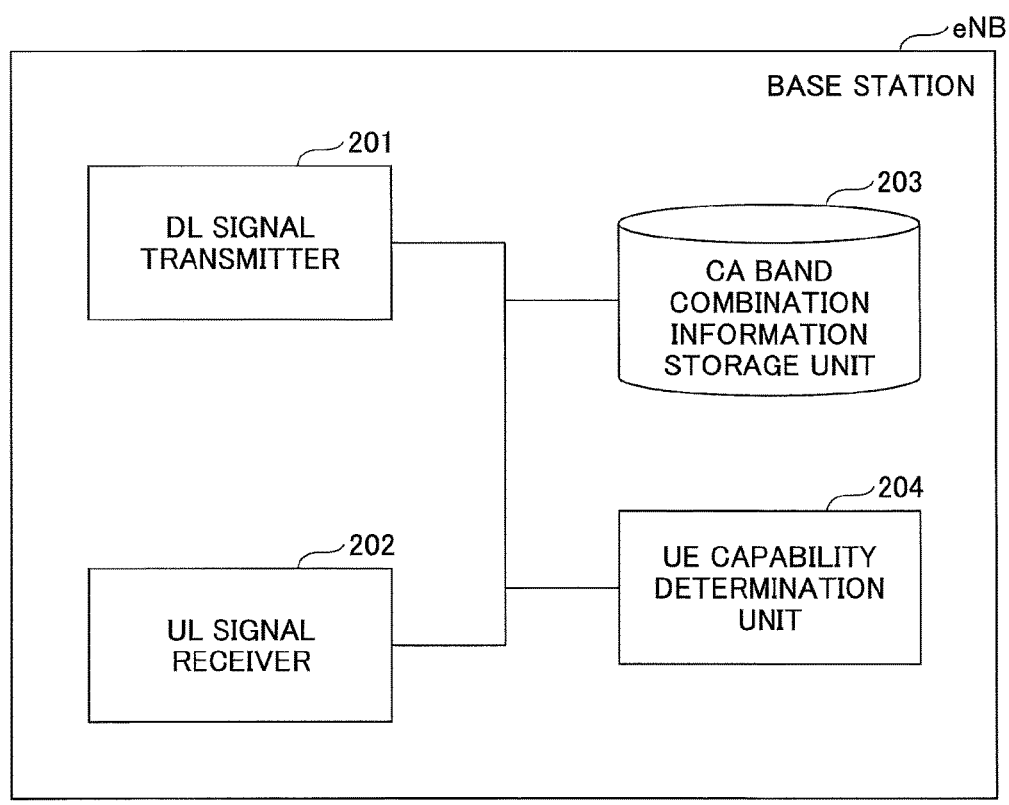
FIG. 12 is a functional configuration diagram of a base station eNB according to the embodiment of the present invention.

FIG. 12 shows a functional configuration diagram of the base station eNB in the embodiment. As illustrated in FIG. 12, the base station eNB includes a DL signal transmitter 201; a UL signal receiver 202; a CA band combination information storage unit 203; and a UE capability determination unit 204. Note that FIG. 12 only illustrates, in the base station eNB, the functional units particularly related to the embodiment of the present invention; and functions, which are not depicted, for performing at least operation conforming to LTE are also included.

The DL signal transmitter 201 includes a function for generating various types of physical layer signals from higher layer information to be transmitted from the base station eNB, and for transmitting them to the user equipment UE. The UL signal receiver 202 includes a function for receiving various types of uplink signals from the user equipment UE, and for retrieving the higher layer information from the received physical layer signals.

The CA band combination information storage unit 203 stores table information including the highest CA band combination, and all of its fallback band combinations. For example, the table information, such as that of shown in FIG. 9, is stored.

The UE capability determination unit 204 determines, based on the CA band combination information received from the user equipment UE, the CA band combinations supported by the user equipment UE (which includes the fallback band combinations), and various types of parameters supported by the user equipment UE.

<Hardware Configuration>

The block diagrams (FIG. 11 and FIG. 12) used for describing the above-described functional configuration indicates blocks in units of functions. These functional blocks (components) are implemented by any combination of hardware and/or software. Furthermore, the method of implementing each functional block is not particularly limited. Namely, each functional block may be implemented by a single device that is physically and/or logically coupled; or may be implemented by devices obtained by directly and/or indirectly (e.g., by wire and/or radio) connecting the physically and/or logically separated two or more devices.

Figure 13:
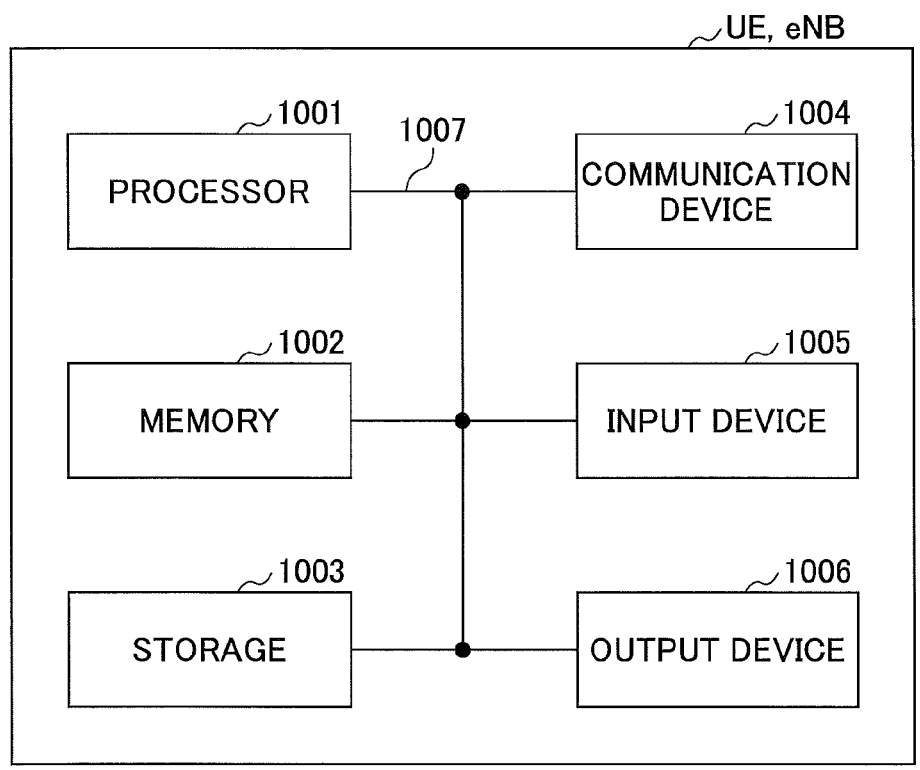
FIG. 13 is a hardware configuration diagram of the user equipment UE and the base station eNB according to the embodiment of the present invention.

For example, the user equipment UE and the base station eNB in the embodiment of the present invention may be function as computers for executing the processes of the information reporting method or the information receiving method according to the present invention. FIG. 13 is a diagram illustrating a hardware configuration of each of the user equipment UE and the base station eNB according to the embodiment of the present invention. The above-described user equipment UE and the base station eNB may be physically configured as computers, each including a processor 1001; a memory 1002; a storage 1003; a communication device 1004; an input device 1005; an output device 1006; a bus 1007, and so forth.

Note that, in the following description, the term "device" may be replaced with a circuit, a device, a unit, and so forth. The hardware configuration of each of the user equipment UE and the base station eNB may be configured to include one or more of the respective devices illustrated in the figures; or may be configured without including a part of the devices.

Each function of the user equipment UE and the base station eNB is implemented by executing an operation by the processor 1001 to control communication by the communication device 1004 and reading data from and/or writing data in the memory 1002 and the storage 1003 by loading predetermined software (program) on the hardware, such as the processor 1001 and the memory 1002.

For example, the processor 1001 causes an operating system to operate so as to control the entire computer. The processor 1001 may be formed of a central processing unit (CPU: Central Processing Unit) including an interface with a peripheral device; a control device; an arithmetic unit; a resister, and so forth. For example, the DL signal receiver 101, the UL signal transmitter 102; the UE capability information storage unit 103, and the generator 104 of the user equipment UE, and the DL signal transmitter 201, the UL signal receiver 202, the CA band combination information storage unit 203, and the UE capability determination unit 204 of the base station eNB may be implemented by the processor 1001.

Furthermore, the processor 1001 reads a program (program code), a software module, or data from the storage 1003 and/or the communication device 1004 to the memory 1002; and executes various processes in accordance with these. As the program, a program is used that is for causing a computer to execute at least a part of the operation described in the embodiment above. For example, the DL signal receiver 101, the UL signal transmitter 102; the UE capability information storage unit 103, and the generator 104 of the user equipment UE, and the DL signal transmitter 201, the UL signal receiver 202, the CA band combination information storage unit 203, and the UE capability determination unit 204 of the base station eNB may be implemented by a control program stored in the memory 1002 and operated by the processor 1001; and the other functional blocks may be implemented similarly. It is described that the above-described various processes are implemented by the single processor 1001; however, it may be simultaneously or sequentially executed by two or more processors 1001. The processor 1001 may be implemented by one or more chips. Note that the program may be transmitted from a network through an electronic communication line.

The memory 1002 is a computer readable recording medium; and may be formed of, for example, at least one of a ROM (Read Only Memory), an EPROM (Erasable Programmable ROM), an EEPROM (Electrically Erasable Programmable ROM), a RAM (Random Access Memory), and so forth. The memory 1002 may be referred to as a register, a cache, a main memory (main storage device), and so forth.

The memory 1002 can store a program (program code), a software module, and so forth that can be executed for implementing the information reporting method or the information receiving method according to the embodiment of the present invention.

The storage 1003 is a computer readable recording medium; and it can be formed of, for example, at least one of an optical disc such as a CD-ROM (Compact Disc ROM), a hard disk drive, a flexible disc, a magneto-optical disk (for example, a compact disk, a digital versatile disk, and a Blu-ray (registered trademark) disk), a smart card, a flash memory (e.g., a card, a stick, and a key drive), a floppy (registered trademark) disk, a magnetic strip, and so forth. The storage 1003 may be referred to as an auxiliary storage device. The above-described storage medium may be, for example, a database including the memory 1002 and/or the storage 1003, a server, or any other appropriate medium.

The communication device 1004 is hardware (transmission and reception device) for executing communication between computers through a wired and/or wireless network; and is also referred to as, for example, a network device, a network controller, a network card, a communication module, and so forth. For example, the DL signal receiver 101 and the UL signal transmitter 102 of the user equipment UE, and the DL signal transmitter 201 and the UL signal receiver 202 of the base station eNB may be implemented by the communication device 1004.

The input device 1005 is an input device for receiving an input from outside (e.g., a keyboard, a mouse, a microphone, a switch, a button, a sensor, etc.). The output device 1006 is an output device for implementing output to outside (e.g., a display, a speaker, a LED lamp, etc.). Note that the input device 1005 and the output device 1006 may be integrated (for example, a touch panel).

Furthermore, the devices, such as the processor 1001 and the memory 1002, are connected by the bus 1007 for communicating information. The bus 1007 may be formed of a single bus; or may be formed of different buses among the devices.

Furthermore, the user equipment UE and the base station eNB may be formed to include hardware, such as a microprocessor, a digital signal processor (DSP: Digital Signal Processor), an ASIC (Application Specific Integrated Circuit), a PLD (Programmable Logic Device), and a FPGA (Field Programmable Gate Array); and by the hardware, a part of or all of the functional blocks may be implemented. For example, the processor 1001 may be implemented by at least one of these hardware components.

<Processing Procedure>

(Operation Sequence)

Figure 14:
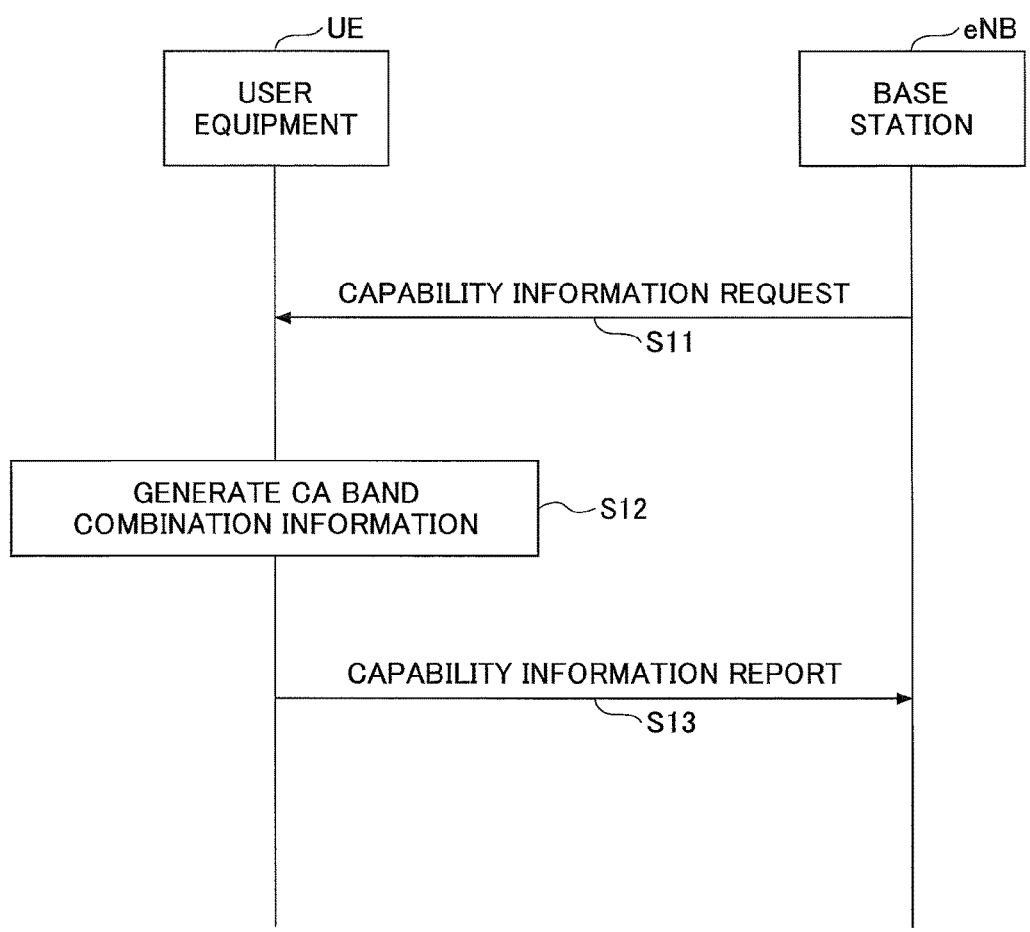
FIG. 14 is a sequence diagram illustrating an operation of the radio communication system according to the embodiment of the present invention.

FIG. 14 is a sequence diagram illustrating an operation of the radio communication system according to the embodiment of the present invention.

At step S11, the DL signal transmitter 201 of the base station eNB transmits a capability information request signal to the user equipment UE. The capability information request signal may be "UECapabilityEnquiry message," for example. Note that, when the CA band combination information (for convenience, which is referred to as "CA band combination information with a new format," hereinafter) in the embodiment is supported, the DL signal transmitter 201 may cause information indicating that the CA band combination information with the new format is requested to be included in the capability information request signal. The information may be referred to as "enhancedCAcapabilityRequest," for example. FIG. 15 shows a specific example of "UECapabilityEnquiry message." Note that the DL signal transmitter 201 of the base station eNB may cause information indicating a plurality of bands supported by the base station eNB to be included in the capability information request signal. The information indicating the plurality of bands supported by the base station is referred to as "requestedFrequencyBands," for example.

At step S12, the generator 104 of the user equipment UE generates the CA band combination information. When the CA band combination information with the new format is requested by the base station eNB, and when the user equipment UE itself has the capability of generating the CA band combination information with the new format, the generator 104 generates the CA band combination information with the new format. However, when the CA band combination information with the new format is not requested by the base station eNB, or when the user equipment UE itself does not have the capability of generating the CA band combination information with the new format (or when it may not recognize information indicating that the CA band combination information with the new format is requested), the generator 104 generates the CA band combination information with a usual format. Here, the processing procedure for generating the CA band combination information with the new format by the generator 104 is specifically described.

Figure 16:
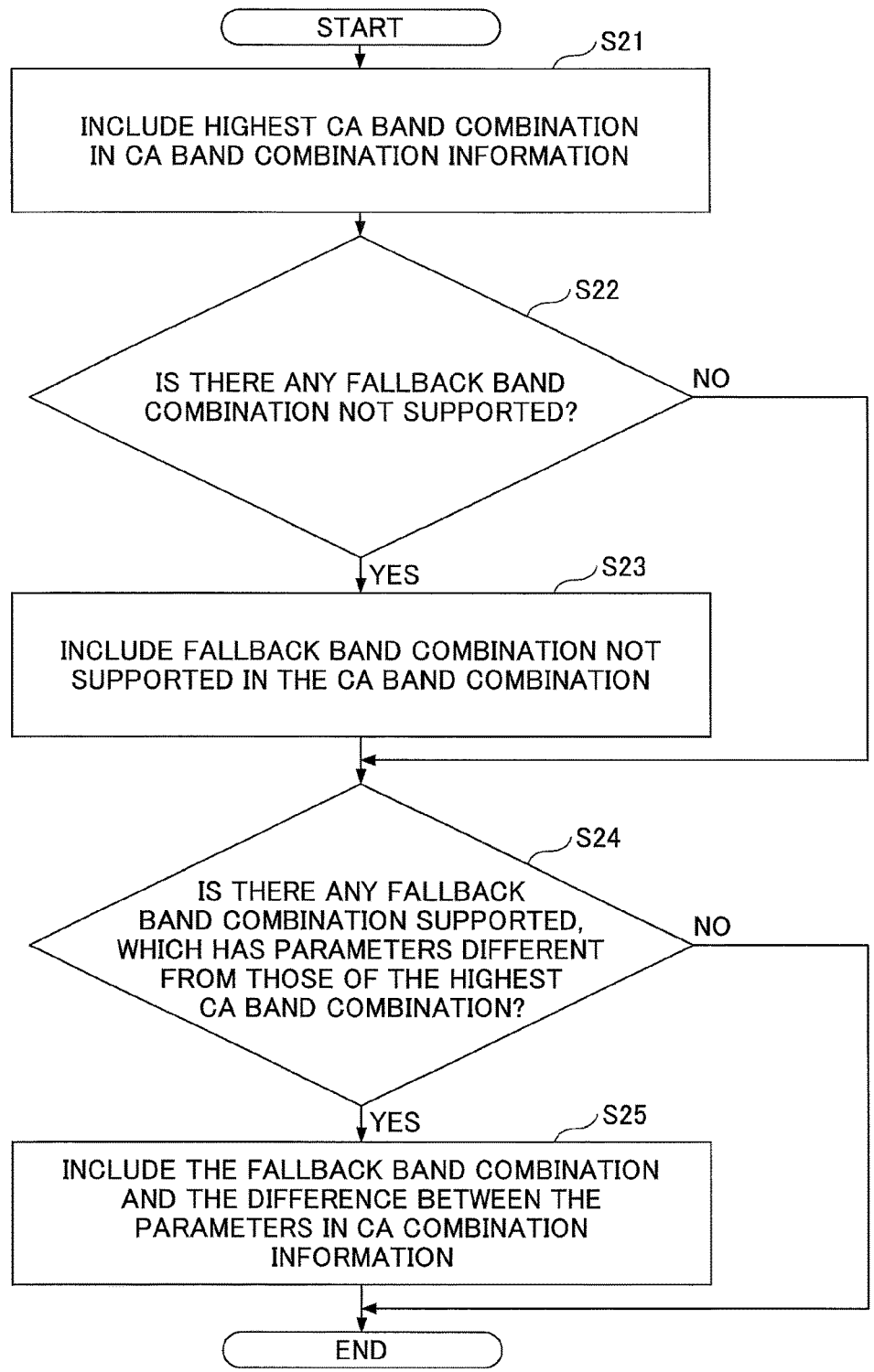
FIG. 16 is a flowchart illustrating a processing procedure for generating the CA band combination information.

FIG. 16 is a flowchart illustrating a processing procedure for generating the CA band combination information. Furthermore, FIG. 17 and FIG. 18 show a specific example of the CA band combination information.

At step S21, the generator 104 causes information indicating the highest CA band combination among the CA band combinations supported by the user equipment UE itself to be included in the CA band combination information. Note that "information indicating the highest CA band combination" may be referred to as "BandCombinationParametersParent," as shown in FIG. 17 and FIG. 18.

At step S22, the generator 104 confirms whether there exists a fallback band combination not supported by the user equipment UE, among all the fallback band combinations of the highest CA band combination. If there is an unsupported fallback band combination, the process proceeds to step S23; and if not, the process proceeds to step S24.

At step S23, the generator 104 causes information indicating the unsupported fallback band combination to be included in the CA band combination information. Note that "information indicating the unsupported fallback band combination" may be referred to as "non-SupportedBandCombinationChild," as shown in FIG. 17 and FIG. 18.

At step S24, the generator confirms whether there exists a fallback band combination including parameters that are different from the various types of parameters in the highest CA band combination, among the supported fallback band combinations. If there is a fallback band combination including parameters that are different from the various types of parameters in the highest CA band combination, the process proceeds to step S25; and if not, the process of generating the CA band combination information is terminated.

At step S25, the generator 204 causes information on the fallback band combination in which only the parameter, among the various types of parameters, that is different from that of the highest CA band combination is set to be included in the CA band combination information. Note that "information on the fallback band combination in which only the parameter, among the various types of parameters, that is different from that of the highest CA band combination is set" may be referred to as "supportedBandCombinationChildExt," as shown in FIG. 17 and FIG. 18. Note that, at step S24 and step S25, the generator 104 may set, in addition to the different parameter, a part of the parameters (e.g., the number of MIMO layers, etc.) of the parameters that are the same as those of the highest CA band combination to be included in the CA band combination information, instead of only setting the parameter, among the various types of parameters, that is different from that of the highest CA band combination in "information on the fallback band combination in which only the parameter, among the various types of parameters, that is different from that of the highest CA band combination is set." Furthermore, at step S24 and step S25, for the fallback band combination including the parameter, among the various types of parameters, that is different from that of the highest CA band combination, the generator 104 may cause information on the fallback band combination in which all the parameters (i.e., all the different parameter and the parameters with the same values) are set to be included in the CA band combination information. In this manner, a likelihood that the base station eNB erroneously recognizes the capability of the user equipment UE can be reduced.

Note that, when the information indicating the plurality of bands supported by the base station eNB is reported, the generator 104 causes, in the processing procedures from step S21 through step S25, information indicating the highest CA band combination among the reported plurality of bands; information indicating the unsupported fallback band combinations; and information on fallback band combinations in which only the parameter, among the various types of parameters, that is different from that of the highest CA band combination is set to be included in the CA band combination information. In other words, the generator 104 may generate the CA band combination information that is filtered by the plurality of bands reported from the base station eNB. Referring back to FIG. 14, the description is continued.

At step S13, the UL signal transmitter 102 of the user equipment UE transmits a capability information report signal including the generated CA band combination information to the base station eNB. The capability information report signal may be, for example, "UECapabilityInformation message." The UE capability determination unit 204 of the base station eNB determines the CA band combinations supported by the user equipment UE (which includes the fallback band combinations) and various types of parameters supported by the user equipment UE, based on the CA band combination information included in the received capability information.

When the CA band combination information only includes the information indicating the highest CA band combination, the UE capability determination unit 204 determines that the user equipment UE supports the highest CA band combination and all of its fallback band combinations.

Furthermore, when the CA band combination information includes the information indicating the highest CA band combination and information indicating the unsupported fallback band combinations, the UE capability determination unit 204 determines that the user equipment UE supports the highest CA band combination and, among all of its fallback band combinations, the fallback band combinations other than the unsupported fallback band combinations.

Furthermore, when the CA band combination information includes the information indicating the highest CA band combination and information indicating the fallback band combinations in which only a parameter, among the various types of parameters, that is different from that of the highest CA band combination is set, the UE capability determination unit 204 determines that the user equipment UE supports the highest CA band combination and all of its fallback band combinations; and determines that a part of the fallback band combinations supports the parameter that is different from that of the highest CA band combination.

Furthermore, when the CA band combination information includes the information indicating the highest CA band combination, information indicating the unsupported fallback band combinations, and information indicating the fallback band combinations in which only a parameter, among the various types of parameters, that is different from that of the highest CA band combination is set, the UE capability determination unit 204 determines that the user equipment UE supports the highest CA band combination and, among all of its fallback band combinations, the fallback band combinations other than the unsupported fallback band combinations; and further determines that a part of the fallback band combinations supports the parameter that is different from that of the highest CA band combination.

Modified Example 1

Figure 20:
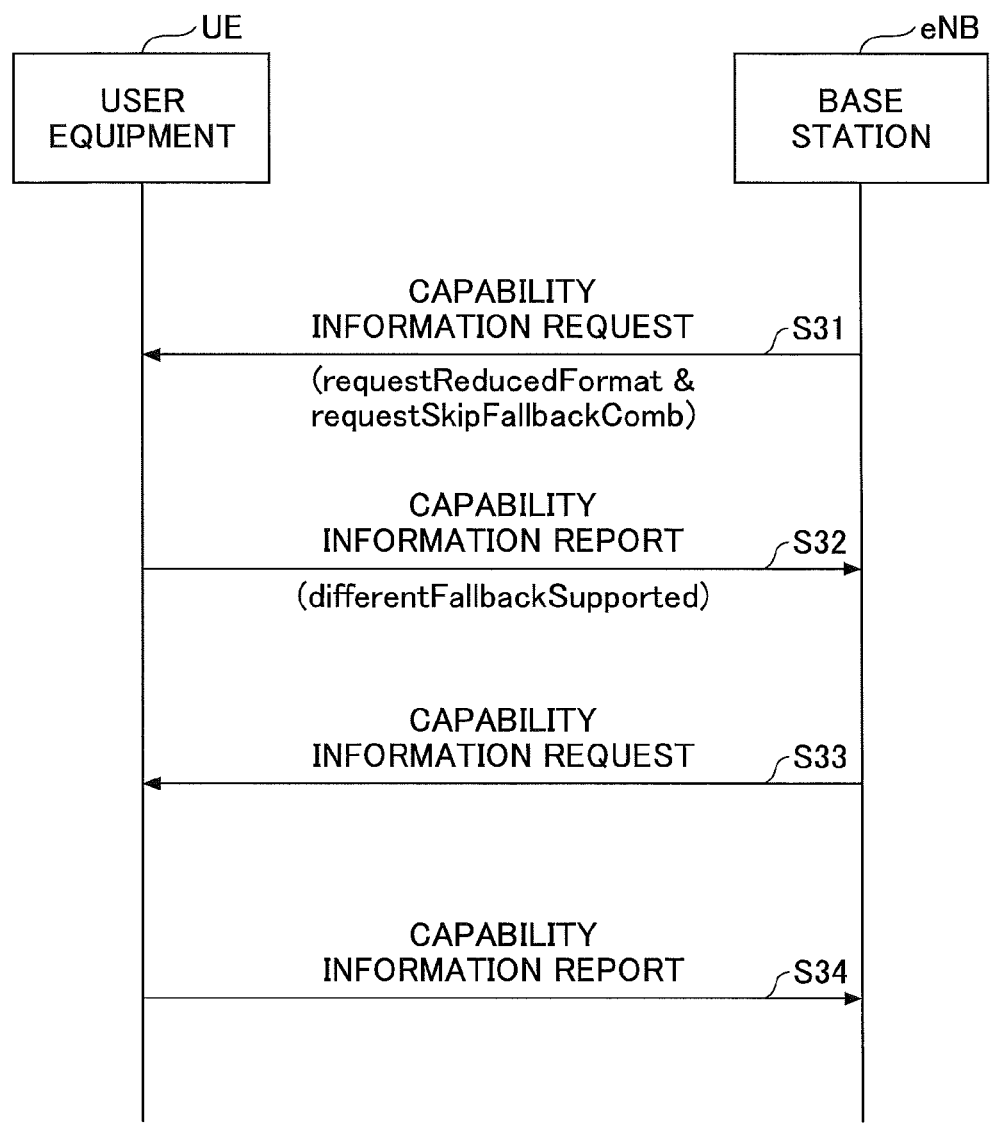
FIG. 20 is a diagram illustrating a method of reporting the CA band combination specified in 3GPP.

The operation performed by the radio communication system according to the embodiment of the present invention is described above; and, in the following, another example of the operation to be performed by the radio communication system is described, as a modified example 1. Here, the method of reporting the CA band combination specified in Release 13 of 3GPP is described by referring to FIG. 20.

At step S31, the base station eNB transmits a capability information request signal (UECapabilityEnquiry) including "requestReducedFormat" and "requestSkipFallbackComb." Here, the "equestReducedFormat" indicates a command that the CA band combination is to be reported by using the format (supportedBandCombinationReduced-r13) specified in Release 13, instead of the usual format (supportedBandCombination-r10). The "requestSkipFallbackComb" indicates a command that the fallback band combinations are to be omitted, and that only the highest CA band combination is to be reported.

At step S32, the user equipment UE causes the CA band combination information including the information indicating the highest CA band combination to be included in the capability information report signal (UECapabilityInformation); and transmits it to the base station eNB. Here, if there exists, among the supported fallback band combinations, a fallback band combination including a parameter that is different from that of the various types of parameters of the highest CA band combination, the user equipment UE causes "information indicating that there exists the fallback band combination including the parameter that is different from that of the various types of parameters of the highest CA band combination (differentFallbackSupported)" to be included in the capability information report signal.

When, at step S33, the base station eNB that receives the capability information report signal including the "differentFallbackSupported" desires to obtain detailed information on the fallback band combination including the parameter that is different from that of the various types of parameters of the highest CA band combination, the capability information request signal (UECapabilityEnquiry) is transmitted again. Note that, unlike the capability information request signal transmitted at step S31, the base station eNB transmits, at step S33, the capability information request signal to the user equipment UE without including the "requestReducedFormat" and the "requestSkipFallback-Comb." Namely, the base station eNB requests the CA band combination information with the usual format (supported-BandCombination-r10) (i.e., the CA band combination information including all the CA band combinations) from the user equipment UE.

At step S34, the user equipment UE transmits, to the base station eNB, the capability report signal including the CA band combination information with the usual format.

As described above, according to the method of reporting the CA band combination specified in Release 13 of 3GPP, if there exists, among the fallback band combinations supported by the user equipment UE, a fallback band combination including a parameter that is different from that of the various types of parameters of the highest CA band combination, the user equipment UE is to report the CA band combination information with the usual format to the base station eNB. Since all the CA band combinations are included in the CA band combination information with the usual format, there is a problem that the signaling amount becomes enormous.

Accordingly, if there exists a fallback band combination including a parameter that is different from that of various types of parameters of the highest CA band combination, the modified example 1 proposes a scheme that can efficiently report, to the base station eNB, the fallback band combination including the different parameter.

<Functional Configuration>

Functional configurations of the user equipment UE and the base station eNB according to the modified example 1 are described. The functional configurations of the user equipment UE and the base station eNB according to the modified example 1 are the same as those of FIG. 11 and FIG. 12, respectively, so that only the functional units that are different from those of the basic example are described.

(User Equipment)

If there exists, among parameters corresponding to CA band combinations that can be used for CA in the user equipment UE, a fallback band combination including a parameter that is different from the parameter corresponding to the highest CA band combination, the generator 104 generates the CA band combination information further including information indicating that there exists the fallback band combination including the different parameter.

Furthermore, when the base station eNB instructs to report, among fallback combinations of a predetermined CA band combination, a fallback band combination including a parameter that is different from the parameter corresponding to the predetermined CA band combination, the generator 104 generates the CA band combination information including information indicating the fallback band combination including the parameter that is different from the parameter corresponding to the predetermined CA band combination, among the fallback band combinations of the predetermined CA band combination.

(Base Station)

If the CA band combination information including information indicating that there exists a fallback band combination including, among parameters corresponding to CA band combinations that can be used for CA in the user equipment UE, a parameter that is different from the parameter corresponding to the highest CA band combination is received from the user equipment UE, the UE capability determination unit 204 recognizes that the user equipment UE is provided with capability of supporting the fallback band combination including the parameter that is different from the parameter corresponding to the highest CA band combination.

If the UE capability determination unit 204 recognizes that the user equipment is provided with the capability of supporting the fallback band combination including the parameter that is different from the parameter corresponding to the highest CA band combination, the DL signal transmitter 201 may transmit, to the user equipment UE, a signal for instructing to report, among the fallback combinations of the predetermined CA band combination, the fallback band combination including the parameter that is different from the parameter corresponding to the predetermined CA band combination.

<Processing Procedure>

(Operation Sequence)

Figure 21:
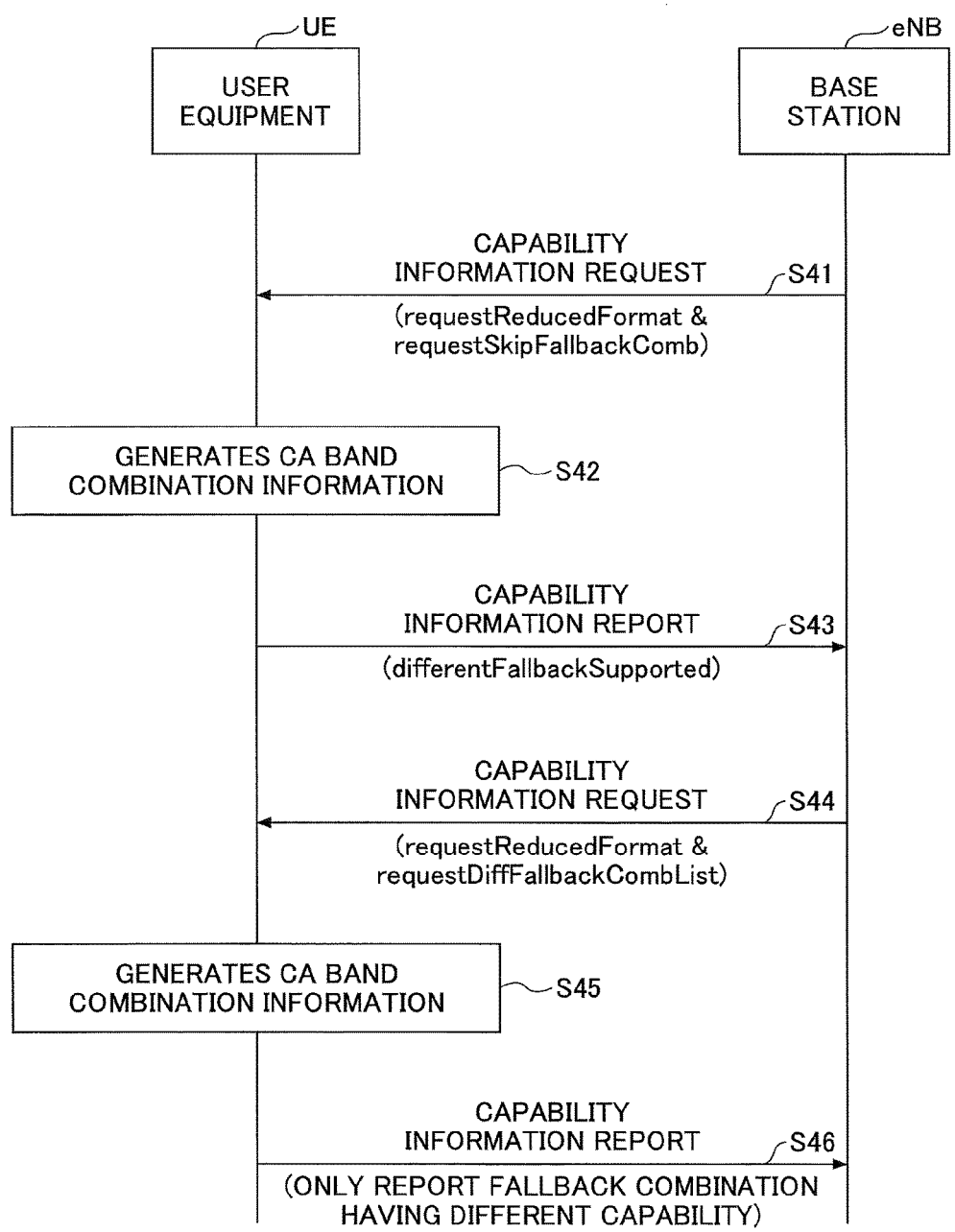
FIG. 21 is a sequence diagram illustrating an operation of the radio communication system according to a modified example 1.

FIG. 21 is a sequence diagram illustrating an operation of the radio communication system according to the modified example 1 of the present invention. Since the processing procedure of step S41 is the same as that of step S31 of FIG. 20, the description is omitted.

At step S42, the generator 104 of the user equipment UE generates the CA band combination information including information indicating the highest CA band combination. Furthermore, if there exists, among the supported fallback band combinations, a fallback band combination including a parameter that is different from that of the various types of parameters of the highest CA band combination, the generator 104 generates the CA band combination information including information indicating the highest CA band combination and "information indicating that there exists the fallback band combination including the parameter that is different from that of the various types of parameters of the highest CA band combination(differentFallback-Supported)."

At step S43, the UL signal transmitter 102 of the user equipment UE transmits the capability information report signal (UECapabilityInformation) including the generated CA band combination information to the base station eNB. Note that step S42 and step S43 correspond to step S32 of FIG. 20.

If the capability information report signal including the "differentFallbackSupported" is received, and if it is desirable to obtain detailed information on the fallback band combination including the parameter that is different from that of the various types of parameters of the highest CA band combination, the DL signal transmitter of the base station eNB transmits, at step S44, the capability information request signal (UECapabilityEnquiry) again. Here, the DL signal transmitter of the base station eNB causes "a command for requesting to report, among the fallback combinations of the predetermined CA band combination, the fallback band combination including the parameter that is different from the parameter corresponding to the predetermined CA band combination" to be included in the capability request signal; and transmits it to the user equipment UE. The command may be referred to as "requestDiff-FallbackCombList."

It is assumed that the predetermined CA band combination is the same as the highest CA band combination included in the capability information report signal reported from the user equipment UE; however, it is not necessarily limited to this, and it includes the CA band combination, reporting of which is desired by the base station eNB. For example, if a plurality of highest CA band combinations is reported from the user equipment UE in the processing procedure of step S43, the predetermined CA band combination may be, among the plurality of the highest CA band combinations, one or more highest CA band combinations, reporting of which are desired by the base station eNB. Furthermore, the predetermined CA band combination may be, among the fallback combinations of the highest CA band combination reported from the user equipment UE in the processing procedure of step S43, one or more highest CA band combinations supported by the base station eNB, for example. Suppose that the highest CA band combination reported from the user equipment UE is 1A-3A-19A-42A; and that the CA band combinations supported by the base station eNB are only 1A-3A-19A and its fallback combinations and 3A-19A-42A and its fallback combinations, for example. In this case, the base station eNB may report, instead of 1A-3A-19A-42A, 1A-3A-19A and 3A-19A-42A, as the predetermined CA band combinations. In this manner, the base station eNB can narrow down the CA band combinations to be reported by the user equipment UE to the CA band combinations, reporting of which is desired by the base station eNB itself; and the signaling amount can be reduced.

Furthermore, the capability information request signal to be transmitted at step S44 may further include a command (requestReducedFormat) such that the CA band combination is to be reported by using the format (supportedBandCombinationReduced-r13) specified in Release 13.

At step S45, if the capability information request signal received at step S44 includes "a command requesting to report, among the fallback combinations of the predetermined CA band combination, the fallback band combination including the parameter that is different from the parameter of the predetermined CA band combination," the generator 104 of the user equipment UE generates the CA band combination information including "information indicating the fallback band combination including the parameter that is different from the parameter corresponding to the predetermined CA band combination."

The "information indicating the fallback band combination including the parameter that is different from the parameter corresponding to the predetermined CA band combination" may be information on the CA band combination that only includes the parameter that is different from the parameters corresponding to the predetermined CA band combination. For example, suppose that the user equipment UE supports, in the CA band combination of 19A-42A, which is a fallback combination of 1A-3A-19A-42A, 2-layer MIMO and 4-layer MIMO only in the band of 19A and only the 2-layer MIMO for all of the bands of 42A and the bands of other CA band combinations. In this case, if the base station eNB specifies 1A-3A-19A-42A, as the predetermined CA band combination, the generator 104 of the user equipment UE may generate the CA band combination information only indicating that, in the CA band combination of 19A-42A, 4-layer MIMO is supported in the bands of 19A, and 2-layer MIMO is supported in the bands of 42A. In other words, the CA band combination information may not be generated that indicates that, in the CA band combination of 19A-42A, 2-layer MIMO is supported in the bands of 19A, and 2-layer MIMO is supported in the bands of 42A.

Furthermore, information indicating the highest CA band combination of the fallback band combination including the parameter that is different from the parameter corresponding to the predetermined CA band combination may be included, as an echo back to the base station eNB, in the CA band combination information generated at step S45. The information indicating the highest CA band combination may be referred to as "requestedDiffFallbackCombList." In this manner, the base station eNB may recognize that, for which range of the CA band combinations (namely, the range of the reported highest CA band combination and its fallback combinations), the CA band combination including the different parameter (the fallback combination) is reported from the user equipment UE by using only the capability information report signal reported from the UE without being conscious of the predetermined CA band combination included in the capability information request signal by itself.

Note that the information indicating the highest CA band combination (requestedDiffFallbackCombList) may more specifically be information indicating the CA band combination that is the same as the "predetermined CA band combination" included in the capability request signal received at step S44. Furthermore, it is not limited to this, and the information indicating the highest CA band combination may not be the information indicating the CA band combination that is the same as the "predetermined CA band combination" included in the capability request signal received at step S44, as long as it is information indicating the CA band combination corresponding to a higher layer of the fallback band combination including the parameter that is different from the parameter corresponding to the predetermined CA band combination. In this manner, the user equipment UE can report only a part of the fallback combinations, among the fallback combinations, each including a parameter that is different from the parameter corresponding to the predetermined CA band combination.

At step S46, the UL signal transmitter 102 of the user equipment UE transmits, to the base station eNB, a capability information report signal including the CA band combination information generated at step S45. Based on the CA band combination information included in the received capability information report signal, the UE capability determination unit 204 of the base station eNB can recognize the fallback band combination including the parameter that is different from the parameter corresponding to the predetermined CA band combination.

Note that, if the information indicating a plurality of bands supported by the base station eNB (requestedFrequencyBands) is reported in the capability information request (S41, S42), in each of the processing procedures of step S42 and step S45, the generator 104 causes "information indicating the highest CA band combination" in the reported plurality of bands, and "information indicating the fallback band combination including the parameter that is different from the parameter corresponding to the predetermined CA band combination" in the reported plurality of bands to be included in the CA band combination information. In other words, the generator 104 may generate the CA band combination information that is filtered by the plurality of bands reported from the base station eNB.

(Specification Change Example)

Next, an example of specification change of the RRC message in the modified example 1 is described.

FIG. 22 is a diagram showing a specification change example illustrating the operation of the RRC layer when the user equipment UE generates the capability information report, which is described in step S44 through step S46 of FIG. 21.

In FIG. 22, as it is described as "5>else if the UE supports requestReducedFormat and UE supports diffFallbackCombReport and UECapabilityEnquiry message includes requestDiffFallbackCombList," if the user equipment UE supports the format specified in Release 13 (requestReducedFormat), supports the operation illustrated in the modified example 1 (diffFallbackCombReport), and receives the capability information request (UECapability-Enquiry) including "a command requesting to report, among the fallback combinations of a predetermined CA band combination, the fallback band combination including the parameter that is different from the parameter corresponding to the predetermined CA band combination" (requestDiff-FallbackCombList), the user equipment UE performs the following operation.

Specifically, first, as described as "6>for each CA band combination indicated in requestDiffFallbackCombList, include its fallback band combinations for which the capabilities are different from the band combination indicated in requestDiffFallbackCombList," the user equipment UE generates a capability information report (UECapabilityInformation) including, for each of the fallback band combinations of a predetermined CA band combination instructed from the base station eNB (one or more CA band combinations included in the "requestDiffFallbackCombList"), a fallback band combination including a parameter (Capability: Capability) that is different from that of the predetermined CA band combination.

Furthermore, as described as "6>include CA band combinations with the highest supported number of DL and UL carriers whose fallback band combinations with different capabilities are to be reported, into requestedDiffFallbackCombList," the user equipment UE causes the highest CA band combination (CA band combinations with the highest supported number of DL and UL carriers) of the fallback combination including the different parameter (Capability: Capability) to be included in the "requestedDiffFallbackCombList."

FIG. 23A and FIG. 23B are diagrams showing a specification change example of the capability information request transmitted at step S44 of FIG. 21. FIG. 23A shows a specification change example of the UECapabilityEnquiry message; and FIG. 23B shows descriptions of the fields included in the UECapabilityEnquiry message. The "command for requesting to report, among fallback combinations of a predetermined CA band combination, the fallback band combination including the parameter that is different from the parameter corresponding to the predetermined CA band combination" described in step S44 of FIG. 21 corresponds to the "requestDiffFallbackCombList" in FIG. 23A and FIG. 23B.

FIG. 24 is a diagram illustrating a specification change example (version 1) of the capability information report that is transmitted at step S46 of FIG. 21. The example of FIG. 24 shows the specification change example of a case of extending the existing signaling (UE-EUTRA-Capability).

The "information indicating the fallback band combination including the parameter that is different from the parameter corresponding to the predetermined CA band combination" described in step S46 of FIG. 21 corresponds to the "supportedBandCombinationReduced" of FIG. 24. Furthermore, the "information indicating the highest CA band combination of the fallback band combination including the parameter that is different from the parameter corresponding to the predetermined CA band combination, as an echo back to the base station eNB" described in step S46 of FIG. 21 corresponds to the "requestedDiffFallbackCombList" of FIG. 24. Furthermore, the "diffFallbackCombReport" of FIG. 24 is information indicating that the user equipment UE supports the operation illustrated in the modified example 1, and it is configured as an echo back to the base station eNB.

FIG. 25 and FIG. 26 are diagrams showing a specification change example (version 2) of the capability information report that is transmitted at step S46 of FIG. 21. Unlike the example of FIG. 24, the example of FIG. 25 and FIG. 26 shows the specification change example for specifying a new "UECapablityInformation" message. In this specification change example, information elements essential to the existing signaling (UE-EUTRA-Capability) can be reduced, so that the signaling amount can be reduced compared with the example of FIG. 24.

The CA band combination information including the "information indicating the fallback band combination including parameter that is different from the parameter corresponding to the predetermined CA band combination" described in step S46 of FIG. 21 corresponds to the "supportedBandCombinationReduced" of FIG. 25. Furthermore, the "information indicating the highest CA band combination of the fallback band combination including the parameter that is different from the parameter corresponding to the predetermined CA band combination, as an echo back to the base station eNB" described in S46 of FIG. 21 corresponds to the "requestedDiffFallbackCombList" of FIG. 25. Furthermore, the "diffFallbackCombReport" of FIG. 26 is information indicating that the user equipment UE supports the operation illustrated in the modified example 1, and it is set as an echo back to the base station eNB.

As described above, according to the modified example 1, the signaling amount for reporting, by the user equipment UE, the fallback band combination including the parameter that is different from that of the various types of parameters of the highest CA band combination to the base station eNB can be reduced compared with the signaling amount in the processing procedure specified in Release 13.

CONCLUSION

As described above, according to the embodiment, there is provided user equipment for communicating with a base station in a radio communication system supporting carrier aggregation, the user equipment including a generator that generates band combination information indicating one or more band combinations capable of being used for the carrier aggregation in the user equipment; and a transmitter that transmits the generated band combination information to the base station, wherein the generator generates the band combination information including highest band combination information indicating a highest band combination having a largest number of component carriers, CCs, to be combined, among the one or more band combinations capable of being used for the carrier aggregation in the user equipment. With this user equipment UE, a technique is provided that is for reducing a signal amount for reporting, by the user equipment, the capability of the CA band combination to the base station in the radio communication system performing carrier aggregation.

Furthermore, when there exists a band combination including a parameter, among parameters respectively corresponding to the band combinations capable of being used for the carrier aggregation in the user equipment, that is different from a parameter corresponding to the highest band combination, the generator may generate the band combination information further including exceptional band combination information indicating the band combination including the different parameter. In this manner, even if there exists an unsupported fallback band combination, it suffices if the user equipment UE reports only the unsupported fallback band combination to the base station eNB, so that the signal amount for reporting the capability of the CA band combination to the base station can be reduced.

Furthermore, upon detecting that a plurality of bands supported by the base station is reported from the base station, the generator may generate the band combination information including highest band combination information indicating a highest band combination having a largest number of CCs to be combined among the plurality of bands. In this manner, even if there exists a fallback band combination with a parameter that is different from that of the highest CA band combination (there is a difference in parameters), it suffices if the user equipment UE reports only the fallback band combination with the different parameter to the base station eNB, so that the signal amount for reporting the capability of the CA band combination to the base station can be reduced.

Furthermore, upon being instructed by the base station, the generator may generate the band combination information; and, upon not being instructed by the base station, the generator may generate band combination information in accordance with a usual format. Depending on the capability of the base station eNB, the format of the CA band combination information can be switched.

Furthermore, upon being instructed by the base station to report, among all band combinations with numbers of CCs that are less than a number of CCs of a predetermined band combination, a band combination including a parameter that is different from a parameter corresponding to the predetermined band combination, the generator may generate, instead of the highest band combination information, the band combination information including information indicating the band combination including the parameter that is different from the parameter corresponding to the predetermined band combination, among all the band combinations with the numbers of CCs that are less than the number of CCs of the predetermined band combination. In this manner, if there exists a fallback band combination including a parameter that is different from that of the various types of parameters of the highest CA band combination, the fallback band combination including the different parameter can be efficiently reported to the base station.

Furthermore, according to the embodiment, there is provided a base station for communicating with user equipment in a radio communication system supporting carrier aggregation, the base station including a receiver that receives, from the user equipment, band combination information indicating one or more band combinations for the carrier aggregation; and a determination unit that determines a band combination capable of being used in the user equipment depending on the one or more band combinations included in the band combination information received by the receiver, wherein, upon detecting that the band combination information includes highest band combination information indicating a highest band combination having a largest number of component carriers, CCs, to be combined, among the one or more band combinations capable of being used for the carrier aggregation in the user equipment, the determination unit determines that the user equipment is capable of using the highest band combination and all band combinations, each having a number of CCs that is less than the number of CCs in the highest band combination. With this base station eNB, a technique is provided that is for reducing a signal amount for reporting, by the user equipment, the capability of the CA band combination to the base station in the radio communication system performing carrier aggregation.

Furthermore, according to the embodiment, there is provided an information reporting method to be executed by user equipment for communicating with a base station in a radio communication system supporting carrier aggregation, the information reporting method including a generation step of generating band combination information indicating one or more band combinations capable of being used for the carrier aggregation in the user equipment; and a transmission step of transmitting the generated band combination information to the base station, wherein the generation step generates the band combination information including highest band combination information indicating a highest band combination having a largest number of component carriers, CCs, to be combined, among the one or more band combinations capable of being used for the carrier aggregation in the user equipment. With this information reporting method, a technique is provided that is for reducing a signal amount for reporting, by the user equipment, the capability of the CA band combination to the base station in the radio communication system performing carrier aggregation.

Furthermore, according to the embodiment, there is provided an information receiving method to be executed by a base station for communicating with user equipment in a radio communication system supporting carrier aggregation, the information receiving method including a reception step of receiving, from the user equipment, band combination information indicating one or more band combinations for the carrier aggregation; and a determination step of determining a band combination capable of being used in the user equipment depending on the one or more band combinations included in the band combination information received by the receiver, wherein, upon detecting that the band combination information includes highest band combination information indicating a highest band combination having a largest number of component carriers, CCs, to be combined, among the one or more band combinations capable of being used for the carrier aggregation in the user equipment, the determination step determines that the user equipment is capable of using the highest band combination and all band combinations, each having a number of CCs that is less than the number of CCs in the highest band combination. With this information receiving method, a technique is provided that is for reducing a signal amount for reporting, by the user equipment, the capability of the CA band combination to the base station in the radio communication system performing carrier aggregation.

<Additional Note>

With regard to the above-described embodiments, it can be further described as the additional notes below.

(Additional Note 1)

User equipment for communicating with a base station in a radio communication system supporting carrier aggregation, the user equipment including a generator that generates band combination information indicating one or more band combinations capable of being used for the carrier aggregation in the user equipment; and a transmitter that transmits the generated band combination information to the base station, wherein the generator generates the band combination information including highest band combination information indicating a highest band combination having a largest number of component carriers, CCs, to be combined and unsupported band combination information indicating an unsupported band combination that is not supported by the user equipment, among the one or more band combinations capable of being used for the carrier aggregation in the user equipment.

(Additional Note 2)

The user equipment according to the additional note 1, wherein, when there exists a band combination including a parameter, among parameters respectively corresponding to the band combinations capable of being used for the carrier aggregation in the user equipment, the parameter being different from a parameter corresponding to the highest band combination, the generator generates the band combination information further including exceptional band combination information indicating the band combination including the different parameter.

(Additional Note 3)

The user equipment according to the additional note 2, wherein, upon detecting that a plurality of bands supported by the base station is reported from the base station, the generator generates the band combination information including highest band combination information indicating a highest band combination having a largest number of CCs to be combined among the plurality of bands; unsupported band combination information indicating, among the plurality of bands, an unsupported band combination that is not supported by the user equipment; and exceptional band combination information indicating, among the plurality of bands, a band combination including a parameter that is different from a parameter corresponding to the highest band combination.

(Additional Note 4)

The user equipment according to any one of additional notes 1 to 3, wherein, upon being instructed by the base station, the generator generates the band combination information; and, upon not being instructed by the base station, the generator generates band combination information in accordance with a usual format.

(Additional Note 5)

A base station for communicating with user equipment in a radio communication system supporting carrier aggregation, the base station including a receiver that receives, from the user equipment, band combination information indicating one or more band combinations for the carrier aggregation; and a determination unit that determines a band combination capable of being used in the user equipment depending on the one or more band combinations included in the band combination information received by the receiver, wherein, upon detecting that the band combination information includes highest band combination information indicating a highest band combination having a largest number of component carriers, CCs, to be combined and unsupported band combination information indicating an unsupported band combination that is not supported by the user equipment, among the one or more band combinations capable of being used for the carrier aggregation in the user equipment, the determination unit determines that the user equipment is capable of using the highest band combination and, among all band combinations having numbers of CCs that are less than the number of CCs of the highest band combination, the band combinations other than the unsupported band combination.

(Additional Note 6)

An information reporting method to be executed by user equipment for communicating with a base station in a radio communication system supporting carrier aggregation, the information reporting method including a generation step of generating band combination information indicating one or more band combinations capable of being used for the carrier aggregation in the user equipment; and a transmission step of transmitting the generated band combination information to the base station, wherein the generation step generates the band combination information including highest band combination information indicating a highest band combination having a largest number of component carriers, CCs, to be combined and unsupported band combination information indicating an unsupported band combination that is not supported by the user equipment, among the one or more band combinations capable of being used for the carrier aggregation in the user equipment.

(Additional Note 7)

An information receiving method to be executed by a base station for communicating with user equipment in a radio communication system supporting carrier aggregation, the information receiving method including a reception step of receiving, from the user equipment, band combination information indicating one or more band combinations for the carrier aggregation; and a determination step of determining a band combination capable of being used in the user equipment depending on the one or more band combinations included in the received band combination information, wherein, upon detecting that the band combination information includes highest band combination information indicating a highest band combination having a largest number of component carriers, CCs, to be combined and unsupported band combination information indicating an unsupported band combination that is not supported by the user equipment, among the one or more band combinations capable of being used for the carrier aggregation in the user equipment, the determination step determines that the user equipment is capable of using the highest band combination and, among all band combinations having numbers of CCs that are less than the number of CCs of the highest band combination, the band combinations other than the unsupported band combination.

<Supplement to the Embodiment>

The method claims present elements of the various steps in a sample order; and are not limited to the presented specific order, unless as explicitly stated in the claims.

As described above, the configuration of each of the devices (the user equipment UE/the base station eNB) described in the embodiment may be a configuration that is implemented by executing a program by the CPU (processor) in the device including the CPU and the memory; a configuration that is implemented by hardware provided with a logic for the process described in the embodiment, such as a hardware circuit; or a mixture of programs and hardware.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. In the sequence charts and the flowcharts described in the embodiment, the order can be replaced, provided that there is no contradiction. For the convenience of description, the user equipment UE and the base station eNB are described by using the functional block diagrams; however, such devices may be implemented in hardware, software, or combinations thereof. Each of the software to be operated by the processor included in the user equipment UE in accordance with the embodiment of the present invention, and the software to be operated by the processor included in the base station eNB in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Note that, in the embodiments, the "CA band combination information" is an example of the band combination information. The "information indicating the highest CA band combination" is an example of the highest band combination information. The "information indicating the unsupported fallback band combination" is an example of the unsupported band combination. Furthermore, the "information of the fallback band combination in which only the parameter that is different from that of the highest CA band combination among the various types of parameters" is an example of the exceptional band combination information.

This patent application is based upon and claims the benefit of priority of Japanese Patent Application No. 2015-159995 filed on Aug. 13, 2015 and the entire contents of Japanese Patent Application No. 2015-159995 are incorporated herein by reference.

LIST OF REFERENCE SYMBOLS

UE: user equipment
eNB: base station
101: DL signal receiver
102: UL signal transmitter
103: UE capability information storage unit
104: generator
201: DL signal transmitter
202: UL signal receiver
203: CA band combination information storage unit
204: UE capability determination unit
1001: processor
1002: memory
1003: storage
1004: communication device
1005: input device
1006: output device

The invention claimed is:

1. A user equipment for communicating with a base station in a radio communication system supporting carrier aggregation, the user equipment comprising:
a processor that generates, upon detecting that a plurality of bands supported by the base station is reported from the base station, band combination information indicating one or more band combinations capable of being used for the carrier aggregation in the user equipment; and
a transmitter that transmits the generated band combination information to the base station,
wherein the processor generates the band combination information including highest band combination information corresponding to the band combination having the largest number of component carriers (CCs) to be combined, among the one or more band combinations capable of being used for the carrier aggregation in the user equipment.

2. The user equipment according to claim 1, wherein, upon being instructed by the base station, the processor generates the band combination information; and, upon not being instructed by the base station, the processor generates band combination information in accordance with a specific format.

3. The user equipment according to claim 2, wherein, upon being instructed by the base station to report, among all band combinations with numbers of CCs that are less than a number of CCs of a predetermined band combination, a band combination including a parameter that is different from a parameter corresponding to the predetermined band combination, the processor generates, instead of the highest band combination information, the band combination information including information indicating the band combination including the parameter that is different from the parameter corresponding to the predetermined band combination, among all the band combinations with the numbers of CCs that are less than the number of CCs of the predetermined band combination.

4. The user equipment according to claim 1, wherein, upon being instructed by the base station to report, among all band combinations with numbers of CCs that are less than a number of CCs of a predetermined band combination, a band combination including a parameter that is different from a parameter corresponding to the predetermined band combination, the processor generates, instead of the highest band combination information, the band combination information including information indicating the band combination including the parameter that is different from the parameter corresponding to the predetermined band combination, among all the band combinations with the numbers of CCs that are less than the number of CCs of the predetermined band combination.

5. A base station for communicating with user equipment in a radio communication system supporting carrier aggregation, the base station comprising:
a transmitter that reports to the user equipment a plurality of bands supported by the base station;
a receiver that receives, from the user equipment, upon the user equipment detecting that the plurality of bands supported by the base station is reported, band combination information indicating one or more band combinations for the carrier aggregation; and
a processor that determines a band combination capable of being used in the user equipment depending on the one or more band combinations included in the band combination information received by the receiver,
wherein, upon detecting that the band combination information includes highest band combination information corresponding to the band combination having the largest number of component carriers (CCs) to be combined, among the one or more band combinations capable of being used for the carrier aggregation in the user equipment, the processor determines that the user equipment is capable of using the highest band combination and all band combinations, each having a number of CCs that is less than the number of CCs in the highest band combination.

6. An information reporting method to be executed by user equipment for communicating with a base station in a radio communication system supporting carrier aggregation, the information reporting method comprising:
a generation step of generating, upon detecting that a plurality of bands supported by the base station is reported from the base station, band combination information indicating one or more band combinations capable of being used for the carrier aggregation in the user equipment; and a transmission step of transmitting the generated band combination information to the base station, wherein the generation step generates the band combination information including highest band combination information corresponding to the band combination having the largest number of component carriers (CCs) to be combined, among the one or more band combinations capable of being used for the carrier aggregation in the user equipment.

7. An information receiving method to be executed by a base station for communicating with user equipment in a radio communication system supporting carrier aggregation, the information receiving method comprising:

a reporting step of reporting to the user equipment a plurality of bands supported by the base station;

a reception step of receiving, from the user equipment, upon the user equipment detecting that the plurality of bands supported by the base station is reported, band combination information indicating one or more band combinations for the carrier aggregation; and a determination step of determining a band combination capable of being used in the user equipment depending on the one or more band combinations included in the received band combination information, wherein, upon detecting that the band combination information includes highest band combination information corresponding to the band combination having the largest number of component carriers (CCs) to be combined, among the one or more band combinations capable of being used for the carrier aggregation in the user equipment, the determination step determines that the user equipment is capable of using the highest band combination and all band combinations, each having a number of CCs that is less than the number of CCs in the highest band combination.

* * * * *